US012400598B2

(12) United States Patent
Feng et al.

(10) Patent No.: US 12,400,598 B2
(45) Date of Patent: Aug. 26, 2025

(54) DRIVING CIRCUIT, DISPLAY APPARATUS, AND METHOD OF OPERATING DRIVING CIRCUIT

(71) Applicant: BOE Technology Group Co., Ltd., Beijing (CN)

(72) Inventors: Yu Feng, Beijing (CN); Libin Liu, Beijing (CN); Shiming Shi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/264,043

(22) PCT Filed: Nov. 30, 2022

(86) PCT No.: PCT/CN2022/135374
§ 371 (c)(1),
(2) Date: Aug. 2, 2023

(87) PCT Pub. No.: WO2024/113218
PCT Pub. Date: Jun. 6, 2024

(65) Prior Publication Data

US 2025/0006133 A1 Jan. 2, 2025

(51) Int. Cl.
*G09G 3/3266* (2016.01)
*G09G 3/32* (2016.01)

(52) U.S. Cl.
CPC ............ *G09G 3/3266* (2013.01); *G09G 3/32* (2013.01); *G09G 2300/0426* (2013.01); *G09G 2310/0202* (2013.01); *G09G 2310/0267* (2013.01); *G09G 2310/08* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 2009/0201233 | A1 | 8/2009 | Yamashita et al. |
| 2021/0027720 | A1 | 1/2021 | Park et al. |
| 2021/0035524 | A1 | 2/2021 | Chun et al. |
| 2021/0304680 | A1 | 9/2021 | Park et al. |
| 2022/0068195 | A1 | 3/2022 | Yun et al. |

(Continued)

FOREIGN PATENT DOCUMENTS

| | | | |
|---|---|---|---|
| CN | 105612620 | A | 5/2016 |
| CN | 110070821 | A | 7/2019 |

(Continued)

OTHER PUBLICATIONS

International Search Report & Written Opinion mailed Mar. 22, 2023, regarding PCT/CN2022/135374.

*Primary Examiner* — Ifedayo B Iluyomade
(74) *Attorney, Agent, or Firm* — Intellectual Valley Law, P.C.

(57) ABSTRACT

A driving circuit is provided. The driving circuit includes one or more scan circuits; wherein the one or more scan circuits comprise a first scan circuit; wherein the first scan circuit comprises a plurality of first scan sub-circuits; and at least two first scan sub-circuits of the plurality of first scan sub-circuits are configured to drive two display sub-areas of a plurality of display sub-areas of a display area with two different driving frequencies in at least one frame of image, respectively.

17 Claims, 23 Drawing Sheets

(56) References Cited

U.S. PATENT DOCUMENTS

| | | | | |
|---|---|---|---|---|
| 2022/0076634 | A1 | 3/2022 | Yoon et al. | |
| 2023/0419882 | A1 * | 12/2023 | Lim | G09G 3/32 |

FOREIGN PATENT DOCUMENTS

| | | | |
|---|---|---|---|
| CN | 111613173 | A | 9/2020 |
| CN | 112309302 | A | 2/2021 |
| CN | 112309326 | A | 2/2021 |
| CN | 113129832 | A | 7/2021 |
| CN | 113450709 | A | 9/2021 |

* cited by examiner

DRIVING CIRCUIT, DISPLAY APPARATUS, AND METHOD OF OPERATING DRIVING CIRCUIT

CROSS-REFERENCE TO RELATED APPLICATION

This application is a national stage application under 35 U.S.C. § 371 of International Application No. PCT/CN2022/135374, filed Nov. 30, 2022, the contents of which are incorporated by reference in the entirety.

TECHNICAL FIELD

The present invention relates to display technology, more particularly, to a driving circuit, a display apparatus, and a method of operating a driving circuit.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides a driving circuit, comprising one or more scan circuits; wherein the one or more scan circuits comprise a first scan circuit; wherein the first scan circuit comprises a plurality of first scan sub-circuits; and at least two first scan sub-circuits of the plurality of first scan sub-circuits are configured to drive two display sub-areas of a plurality of display sub-areas of a display area with two different driving frequencies in at least one frame of image, respectively.

Optionally, the at least two first scan sub-circuits of the plurality of first scan sub-circuits are configured to receive start signals from two start signal lines of a plurality of start signal lines with two different frequencies in at least one frame of image, respectively.

Optionally, the at least two first scan sub-circuits of the plurality of first scan sub-circuits are configured to provide control signals to the two display sub-areas of the plurality of display sub-areas with two different frequencies in at least one frame of image, respectively.

Optionally, the at least two first scan sub-circuits of the plurality of first scan sub-circuits are configured to drive two display sub-areas of a plurality of display sub-areas of a display area with a same driving frequency in at least another frame of image, respectively.

Optionally, the one or more scan circuits further comprises a second scan circuit configured to receive a second start signal from a second start signal line, the second start signal line being configured to provide the second start signal to all scan units of the second scan circuit; and the second scan circuit is configured to provide control signals to the plurality of display sub-areas with a same frequency.

Optionally, in a first mode, the plurality of first scan sub-circuits are configured to provide control signals to the plurality of display sub-areas with a same frequency.

Optionally, in a second mode, the plurality of first scan sub-circuits are configured to provide control signals to the plurality of display sub-areas with a same frequency in a first frame of image; and in the second mode, the at least two first scan sub-circuits of the plurality of first scan sub-circuits are configured to provide control signals to two display sub-areas of the plurality of display sub-areas with two different frequencies in a second frame of image, respectively.

Optionally, in the second mode, at least one of the plurality of first scan sub-circuits is configured to output control signals in the second frame of image at a frequency lower than a frequency of outputting control signals in the first frame of image by the at least one of the plurality of first scan sub-circuits; and at least another one of the plurality of first scan sub-circuits is configured to output control signals in the second frame of image at a frequency higher than a frequency of outputting control signals in the first frame of image by the at least another one of the plurality of first scan sub-circuits.

Optionally, in the second mode, at least one of the plurality of first scan sub-circuits is not configured to output control signals in the second frame of image; and at least another one of the plurality of first scan sub-circuits is configured to output control signals in the second frame of image at a frequency higher than a frequency of outputting control signals in the first frame of image by the at least another one of the plurality of first scan sub-circuits.

Optionally, the one or more scan circuits further comprises a third scan circuit configured to provide control signals to the plurality of display sub-areas with a same frequency in the first frame of image and the second frame of image.

Optionally, the one or more scan circuits further comprises an auxiliary first scan circuit; the first scan circuit and the auxiliary first scan circuit are configured to independently provide control signals to a first display sub-area first part and a first display sub-area second part of a first display sub-area; and a respective row of subpixels in the first display sub-area first part and a respective row of subpixels in the first display sub-area second part are in a same row.

In another aspect, the present disclosure provides a display apparatus, comprising a display panel, the driving circuit described herein, and a plurality of start signal lines; wherein the display panel comprises the display area; and the display area comprises the plurality of display sub-areas.

Optionally, at least two start signal lines of the plurality of start signal lines are configured to provide start signals to the at least two first scan sub-circuits of the plurality of first scan sub-circuits with two different frequencies in at least one frame of image, respectively.

Optionally, in a first mode, the plurality of start signal lines are configured to provide start signals to the plurality of first scan sub-circuits with a same frequency.

Optionally, in a second mode, the plurality of start signal lines are configured to provide start signals to the plurality of first scan sub-circuits with a same frequency in a first frame of image; and at least two start signal lines of the plurality of start signal lines are configured to provide start signals to the at least two respective scan sub-circuits of the plurality of respective scan sub-circuits with two different frequencies in a second frame of image, respectively.

Optionally, in the second mode, at least one of the plurality of start signal lines is configured to provide start signals in the second frame of image to at least one of the plurality of first scan sub-circuits at a frequency lower than a frequency of providing start signals in the first frame of image by the at least one of the plurality of start signal lines to the at least one of the plurality of first scan sub-circuits; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

Optionally, in the second mode, at least one of the plurality of start signal lines is not configured to provide start signals in the second frame of image; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

Optionally, the one or more scan circuits further comprises a third scan circuit; the plurality of start signal lines comprise a third signal line configured to provide a third start signal to the third scan circuit; and the third scan circuit is configured to provide control signals to the plurality of display sub-areas with a same frequency in the first frame of image and the second frame of image.

Optionally, the one or more scan circuits further comprises an auxiliary first scan circuit; the plurality of display sub-area comprise a first display sub-area; the first display sub-area comprises a first display sub-area first part and a first display sub-area second part; a respective row of subpixels in the first display sub-area first part and a respective row of subpixels in the first display sub-area second part are in a same row; and the first scan circuit and the auxiliary first scan circuit are configured to independently provide control signals to the first display sub-area first part and the first display sub-area second part.

In another aspect, the present disclosure provides a method of operating a driving circuit, comprising: providing one or more scan circuits, wherein the one or more scan circuits comprise a first scan circuit, wherein the first scan circuit comprises a plurality of first scan sub-circuits; driving, by at least two first scan sub-circuits of the plurality of first scan sub-circuits, two display sub-areas of a plurality of display sub-areas of a display area with two different driving frequencies in at least one frame of image, respectively.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a driving circuit, a display apparatus, and a method of operating a driving circuit that substantially obviate one or more of the problems due to limitations and disadvantages of the related art. In one aspect, the present disclosure provides a driving circuit. In some embodiments, the driving circuit includes one or more scan circuits. Optionally, the one or more scan circuits include a first scan circuit. Optionally, the first scan circuit comprises a plurality of first scan sub-circuits. Optionally, at least two first scan sub-circuits of the plurality of first scan sub-circuits are configured to drive two display sub-areas of a plurality of display sub-areas of a display area with two different driving frequencies in at least one frame of image, respectively.

Figure 1:
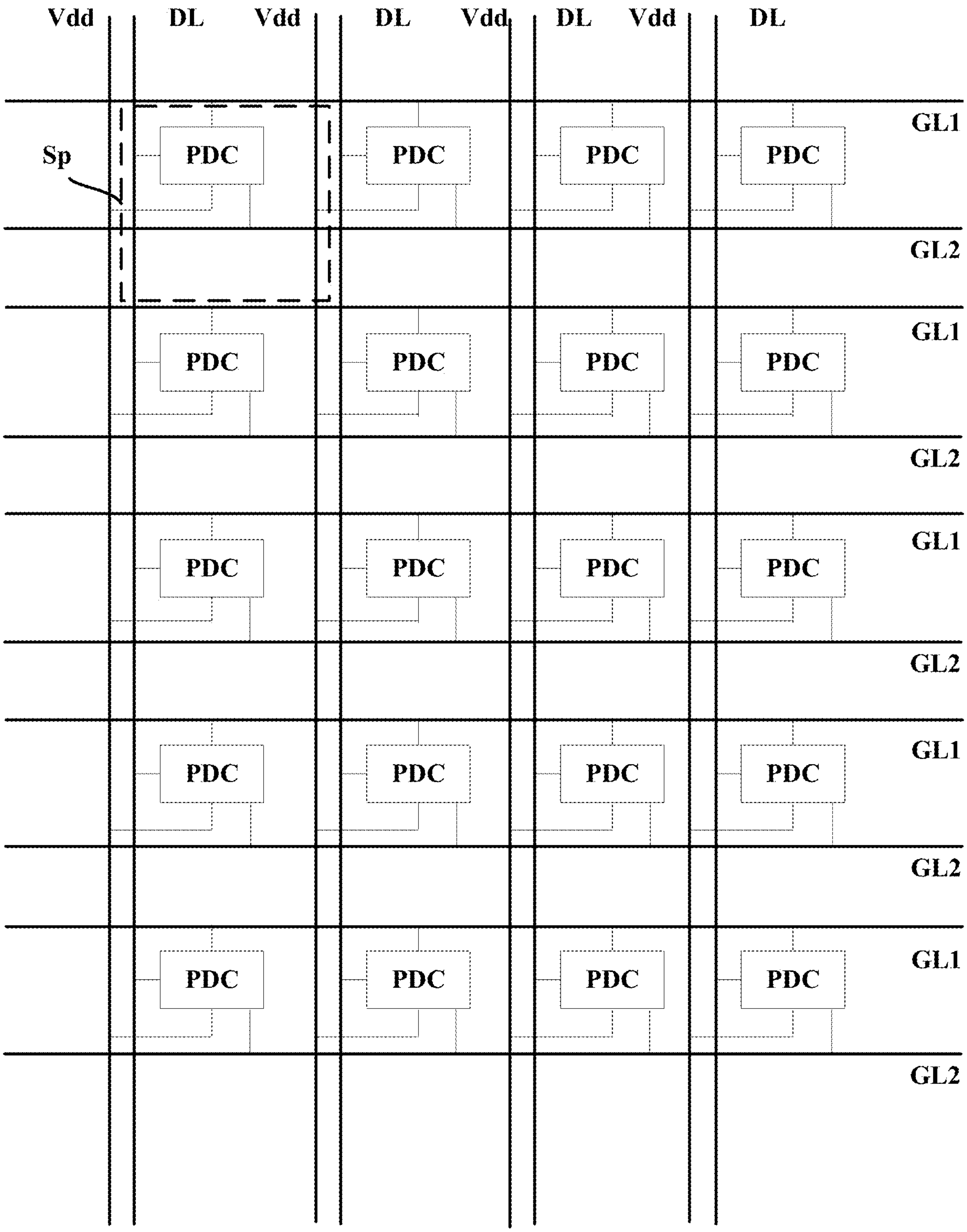
FIG. 1 is a plan view of an array substrate in some embodiments according to the present disclosure.

FIG. 1 is a plan view of an array substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of first gate lines GL1, a plurality of second gate lines GL2, a plurality of data lines DL, a plurality of voltage supply line Vdd, and a respective second voltage supply line (e.g., a low voltage supply line Vss). Light emission in a respective subpixel Sp is driven by a respective pixel driving circuit PDC. In one example, a high voltage signal (e.g., a VDD signal) is input, through the respective high voltage supply line of the plurality of voltage supply line Vdd, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage ΔV that drives light emission in the light emitting element.

Figure 2:
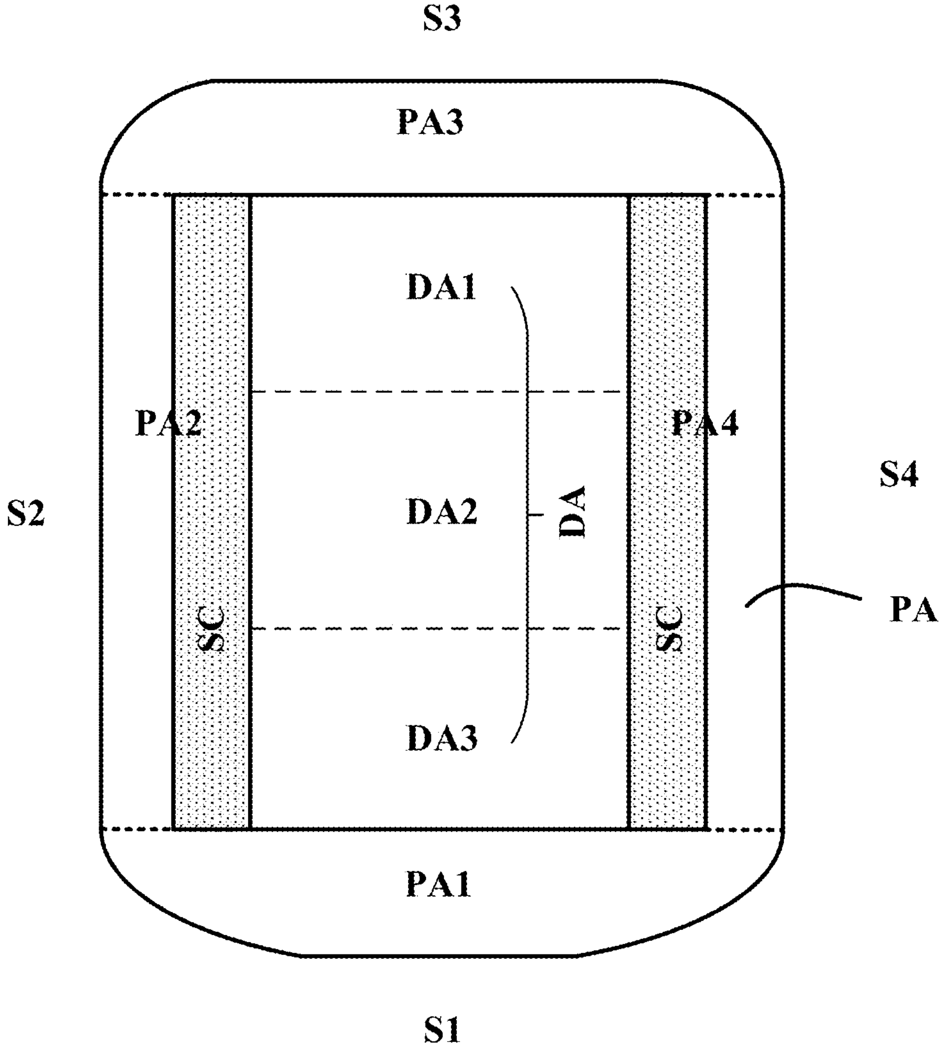
FIG. 2 is a schematic diagram illustrating a display area and a peripheral area in an array substrate in some embodiments according to the present disclosure.

The pixel driving circuits in the array substrate are configured to receive control signals from one or more scan circuits. FIG. 2 is a schematic diagram illustrating a display area and a peripheral area in an array substrate in some embodiments according to the present disclosure. Referring to FIG. 2, in some embodiments, the display substrate includes a display area DA and a peripheral area PA. In some embodiments, the peripheral area PA includes a first sub-area PA1 on a first side S1 of the display area DA, a second sub-area PA2 on a second side S2 of the display area DA, a third sub-area PA3 on a third side S3 of the display area DA, a fourth sub-area PA4 on a fourth side S4 of the display area DA. Optionally, the first side S1 and the third side S3 are opposite to each other. Optionally, the second side S2 and the fourth side S4 are opposite to each other. Optionally, the first sub-area PA1 is a sub-area where signal lines of the display substrate are connected to an integrated circuit.

In some embodiments, the display substrate further includes one or more scan circuits SC in the peripheral area PA. In one example depicted in FIG. 1, the display substrate includes one or more scan circuits SC in the second sub-area PA2 and/or in the fourth sub-area PA4.

The present disclosure may be implemented with various appropriate scan circuits. In one example, the one or more scan circuits SC includes a light emitting control signal generating circuit configured to generate light emitting control signals for subpixels in a display substrate. In another example, the one or more scan circuits SC includes a gate scanning signal generating circuit configured to generate gate scanning signals for subpixels in a display substrate. In another example, the one or more scan circuits SC includes a reset control signal generating circuit configured to generate reset control signals for subpixels in a display substrate.

In some embodiments, each of the one or more scan circuits SC includes a plurality of stages of cascaded scan units. Optionally, the plurality of stages of cascaded scan units are configured to provide a plurality of control signals (e.g., gate scanning signals, reset control signals, or light emission control signals) to a plurality of rows of subpixels.

As shown in FIG. 2, the display area DA in some embodiments includes a plurality of display sub-areas. In one example, the plurality of display sub-areas includes a first display sub-area DA1 and a second display sub-area DA2. In another example, the plurality of display sub-areas includes a first display sub-area DA1, a second display sub-area DA2, and a third display sub-area DA3. At least one of the one or more scan circuits includes a plurality of scan sub-circuits. The plurality of display sub-areas (e.g., pixel driving circuits therein, and/or frame rate thereof) are independently controlled by the plurality of scan sub-circuits, respectively. Optionally, the plurality of display sub-areas are configured to display a plurality of sub-images of different frame rates, respectively.

Figure 3:
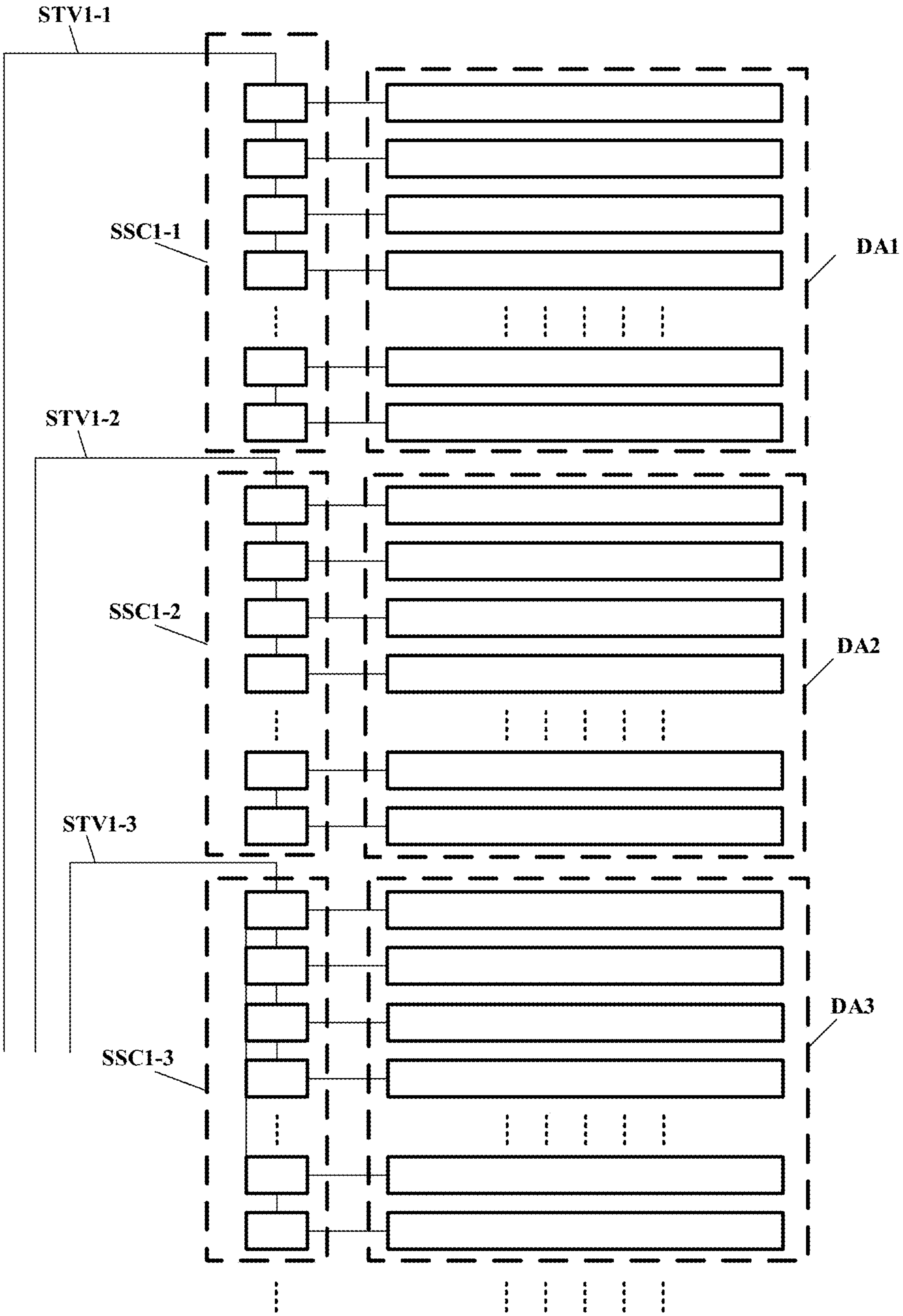
FIG. 3 is a schematic diagram illustrating a first scan circuit in some embodiments according to the present disclosure.

FIG. 3 is a schematic diagram illustrating a first scan circuit in some embodiments according to the present disclosure. Referring to FIG. 3, the first scan circuit in some embodiments includes a plurality of first scan sub-circuits, for example, a first respective first scan sub-circuit SSC1-1, a second respective first scan sub-circuit SSC1-2, and a third respective first scan sub-circuit SSC1-3. The display area DA includes a plurality of display sub-areas, for example, a first display sub-area DA1, a second display sub-area DA2, and a third display sub-area DA3. The plurality of display sub-areas (e.g., pixel driving circuits therein, and/or frame rate thereof) are independently controlled by the plurality of scan sub-circuits, respectively. For example, the first display sub-area DA1 is controlled by the first respective first scan sub-circuit SSC1-1, the second display sub-area DA2 is controlled by the second respective first scan sub-circuit SSC1-2, and the third display sub-area DA3 is controlled by the third respective first scan sub-circuit SSC1-3.

In some embodiments, the first scan circuit is configured to receive a plurality of start signals from a plurality of first start signal lines, respectively. Optionally, the plurality of first scan sub-circuits are configured to receive the plurality of start signals from a plurality of start signal lines, respectively. In one example, the plurality of start signal lines include a first respective first start signal line STV1-1, a second respective first start signal line STV1-2, and a third respective first start signal line STV1-3. The first respective first start signal line STV1-1 is configured to provide a first respective first start signal to the first respective first scan sub-circuit SSC1-1. The second respective first start signal line STV1-2 is configured to provide a second respective first start signal to the second respective first scan sub-circuit SSC1-2. The third respective first start signal line STV1-3 is configured to provide a third respective first start signal to the third respective first scan sub-circuit SSC1-2.

In some embodiments, at least two first scan sub-circuits of the plurality of first scan sub-circuits are configured to drive two display sub-areas of the plurality of display sub-areas with two different driving frequencies, respectively. Optionally, at least two first scan sub-circuits of the plurality of first scan sub-circuits are configured to drive two display sub-areas of the plurality of display sub-areas with two different driving frequencies in at least one frame of image, respectively. Optionally, the at least two first scan sub-circuits are two adjacent first scan sub-circuits.

In alternative embodiments, at least two first scan sub-circuits of the plurality of first scan sub-circuits are configured to drive two display sub-areas of the plurality of display sub-areas with a same driving frequency in at least one frame of image. Optionally, at least two first scan sub-circuits of the plurality of first scan sub-circuits are configured to drive two display sub-areas of the plurality of display sub-areas with a same driving frequency. Optionally, the at least two first scan sub-circuits are two adjacent first scan sub-circuits.

In some embodiments, at least two first scan sub-circuits of the plurality of first scan sub-circuits are configured to receive start signals from two start signal lines of the plurality of start signal lines with two different frequencies, respectively. Optionally, at least two first scan sub-circuits of the plurality of first scan sub-circuits are configured to receive start signals from two start signal lines of the plurality of start signal lines with two different frequencies in at least one frame of image, respectively. Optionally, the at least two first scan sub-circuits are two adjacent first scan sub-circuits.

In alternative embodiments, at least two first scan sub-circuits of the plurality of first scan sub-circuits are configured to receive start signals from two start signal lines of the plurality of start signal lines with a same frequency in at least one frame of image. Optionally, at least two first scan sub-circuits of the plurality of first scan sub-circuits are configured to receive start signals from two start signal lines of the plurality of start signal lines with a same frequency. Optionally, the at least two first scan sub-circuits are two adjacent first scan sub-circuits.

In some embodiments, at least two first scan sub-circuits of the plurality of first scan sub-circuits are configured to provide control signals to two display sub-areas of the plurality of display sub-areas with two different frequencies, respectively. Optionally, at least two first scan sub-circuits of the plurality of first scan sub-circuits are configured to provide control signals to two display sub-areas of the plurality of display sub-areas with two different frequencies in at least one frame of image, respectively. Optionally, the at least two first scan sub-circuits are two adjacent first scan sub-circuits.

In alternative embodiments, at least two first scan sub-circuits of the plurality of first scan sub-circuits are configured to provide control signals to two display sub-areas of the plurality of display sub-areas with a same frequency in at least one frame of image. Optionally, at least two first scan sub-circuits of the plurality of first scan sub-circuits are configured to provide control signals to two display sub-areas of the plurality of display sub-areas with a same frequency. Optionally, the at least two first scan sub-circuits are two adjacent first scan sub-circuits.

In some embodiments, the plurality of first scan sub-circuits include a first respective first scan sub-circuit SSC1-1 and a second respective first scan sub-circuit SSC1-2; and the display area DA includes a first display sub-area DA1 and a second display sub-area DA2. In some embodiments, the first respective first scan sub-circuit SSC1-1 and the second respective first scan sub-circuit SSC1-2 are configured to drive the first display sub-area DA1 and the second display sub-area DA2 with two different driving frequencies, respectively. Optionally, the first respective first scan sub-circuit SSC1-1 and the second respective first scan sub-circuit SSC1-2 are configured to drive the first display sub-area DA1 and the second display sub-area DA2 with two different driving frequencies in at least one frame of image, respectively. Optionally, the first respective first scan sub-circuit SSC1-1 and the second respective first scan sub-circuit SSC1-2 are two adjacent first scan sub-circuits.

In alternative embodiments, the first respective first scan sub-circuit SSC1-1 and the second respective first scan sub-circuit SSC1-2 are configured to drive the first display sub-area DA1 and the second display sub-area DA2 with a same driving frequency in at least one frame of image. Optionally, the first respective first scan sub-circuit SSC1-1 and the second respective first scan sub-circuit SSC1-2 are configured to drive the first display sub-area DA1 and the second display sub-area DA2 with a same driving frequency. Optionally, the first respective first scan sub-circuit SSC1-1 and the second respective first scan sub-circuit SSC1-2 are two adjacent first scan sub-circuits.

In some embodiments, the first respective first scan sub-circuit SSC1-1 and the second respective first scan sub-circuit SSC1-2 are configured to receive start signals from the first respective first start signal line STV1-1 and the second respective first start signal line STV1-2 with two different frequencies, respectively. Optionally, the first respective first scan sub-circuit SSC1-1 and the second respective first scan sub-circuit SSC1-2 are configured to receive start signals from the first respective first start signal line STV1-1 and the second respective first start signal line STV1-2 with two different frequencies in at least one frame of image, respectively.

In alternative embodiments, the first respective first scan sub-circuit SSC1-1 and the second respective first scan sub-circuit SSC1-2 are configured to receive start signals from the first respective first start signal line STV1-1 and the second respective first start signal line STV1-2 with a same frequency in at least one frame of image. Optionally, the first respective first scan sub-circuit SSC1-1 and the second respective first scan sub-circuit SSC1-2 are configured to receive start signals from the first respective first start signal line STV1-1 and the second respective first start signal line STV1-2 with a same frequency.

In some embodiments, the first respective first scan sub-circuit SSC1-1 and the second respective first scan sub-circuit SSC1-2 are configured to provide control signals to the first display sub-area DA1 and the second display sub-area DA2 with two different frequencies, respectively. Optionally, the first respective first scan sub-circuit SSC1-1 and the second respective first scan sub-circuit SSC1-2 are configured to provide control signals to the first display sub-area DA1 and the second display sub-area DA2 with two different frequencies in at least one frame of image, respectively.

In alternative embodiments, the first respective first scan sub-circuit SSC1-1 and the second respective first scan sub-circuit SSC1-2 are configured to provide control signals to the first display sub-area DA1 and the second display sub-area DA2 with a same frequency in at least one frame of image. Optionally, the first respective first scan sub-circuit SSC1-1 and the second respective first scan sub-circuit SSC1-2 are configured to provide control signals to the first display sub-area DA1 and the second display sub-area DA2 with a same frequency.

As used herein, the term "different frequencies" refers to that a total number of signals (e.g., start signals input to the scan sub-circuits or control signals output from the scan sub-circuits) during a plurality of frames of image are different. Two sub-circuits may have a same input/output frequency in one particular frame of image, however, they have different frequencies in at least one frame of image. Thus, during the plurality of frames of image, the two sub-circuits still have different input/output frequencies. As used herein, the term "a same frequency" refers to that a total number of signals (e.g., start signals input to the scan sub-circuits or control signals output from the scan sub-circuits) during a plurality of frames of image or an individual frame of image are the same.

Referring to FIG. 3, a respective scan sub-circuit of the plurality of scan sub-circuit includes multiple stages. Each stage of the respective scan sub-circuit includes one scan unit configured to provide control signals to one row of subpixels.

Figure 4:
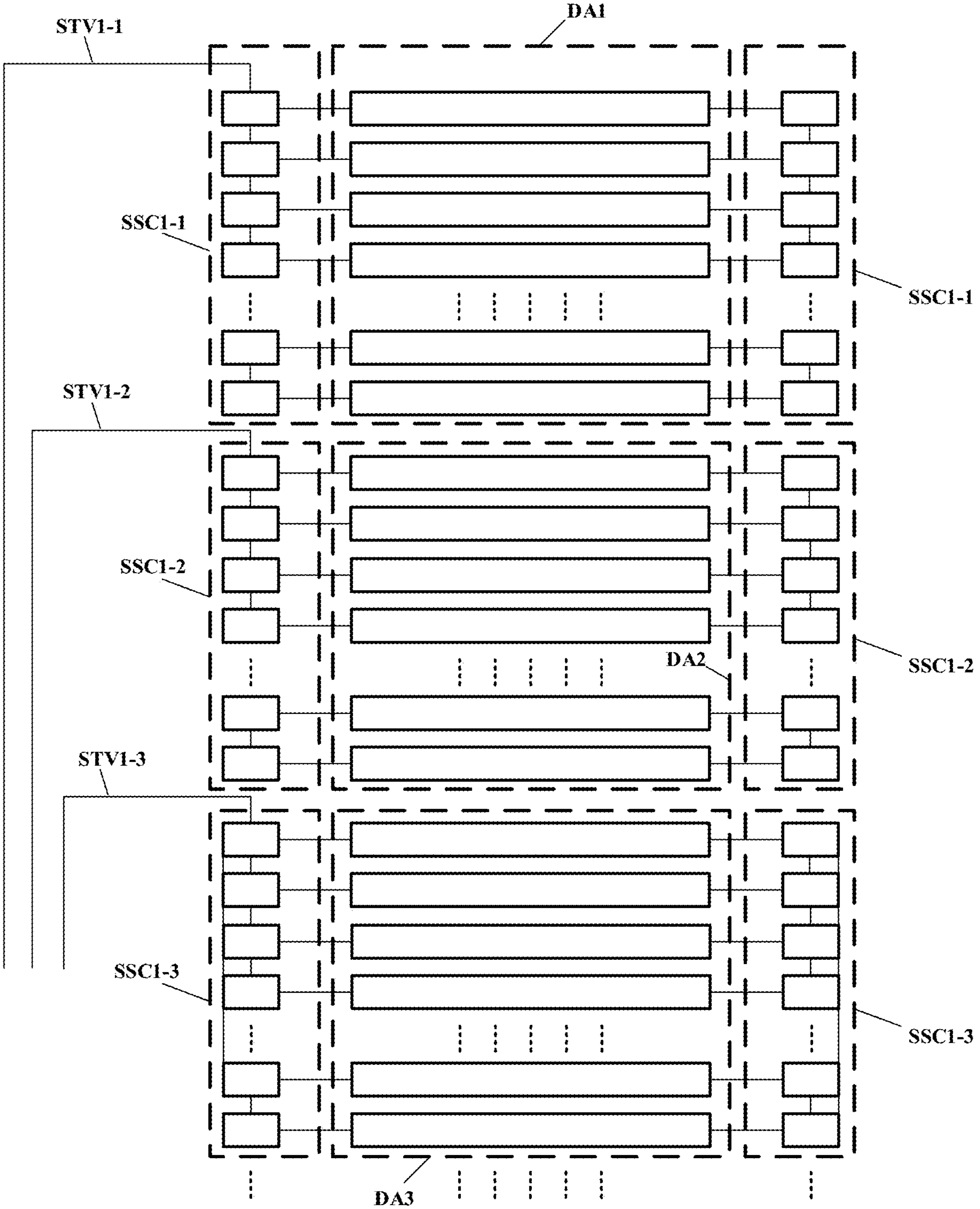
FIG. 4 is a schematic diagram illustrating a first scan circuit in some embodiments according to the present disclosure.

FIG. 4 is a schematic diagram illustrating a first scan circuit in some embodiments according to the present disclosure. The first scan circuit depicted in FIG. 4 is configured to control the plurality of display sub-areas in a manner similar to that described in FIG. 3 and associated texts. The first scan circuit depicted in FIG. 4 differs from the first scan circuit depicted in FIG. 3 in that, in the first scan circuit depicted in FIG. 4, each stage of the respective scan sub-circuit includes two scan units configured to provide control signals to one row of subpixels. The two scan units are on two sides of the display area DA (see, e.g., the second side S2 and the fourth side S4 depicted in FIG. 2).

The first scan circuit in some embodiments is a first gate scanning signal generating circuit configured to generate first gate scanning signals for pixel driving circuits in the display area DA. In one particular example, the first scan circuit is a p-type scan circuit, e.g., a low-temperature polysilicon transistor scan circuit.

Figure 5:
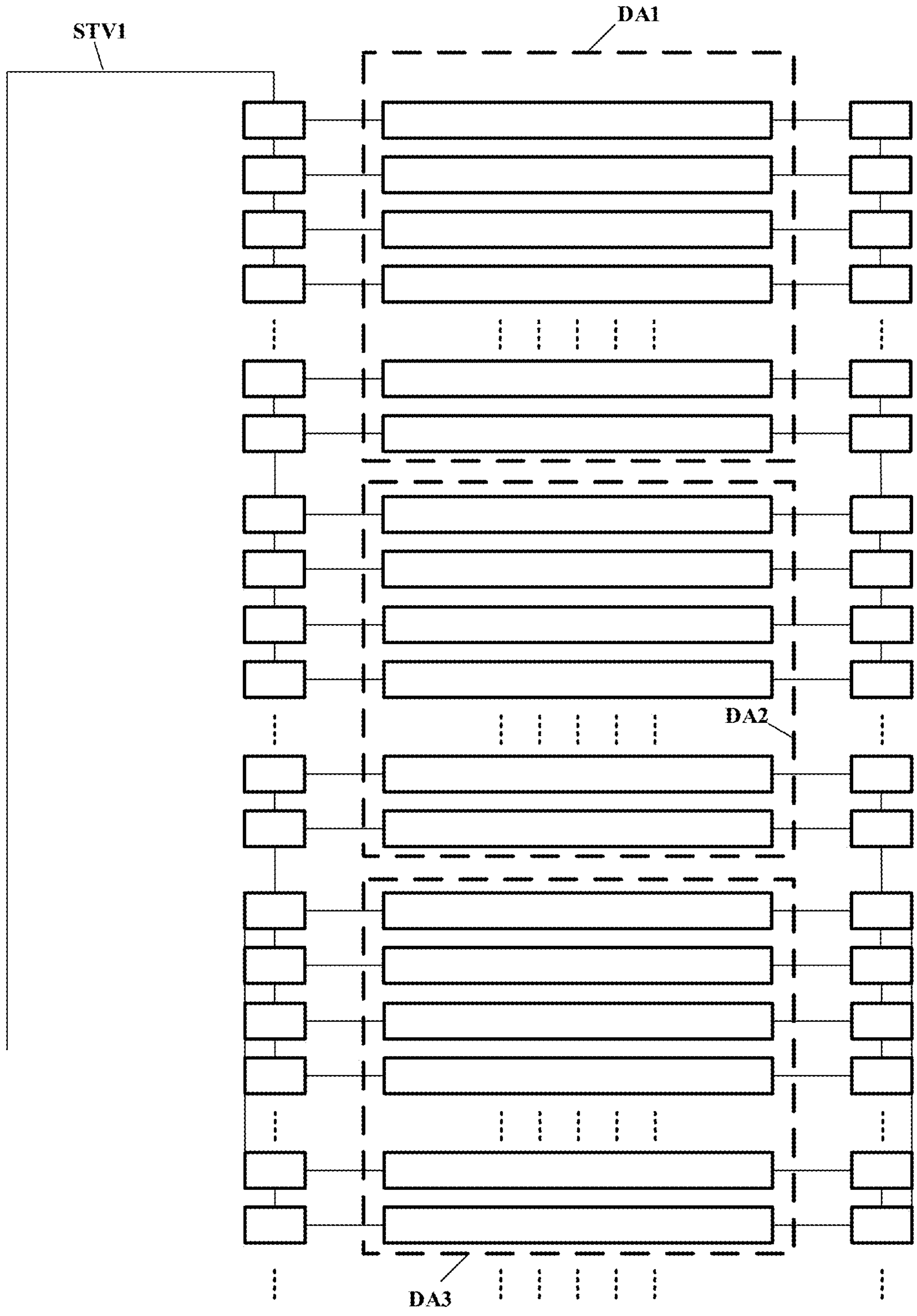
FIG. 5 is a schematic diagram illustrating a first scan circuit in some embodiments according to the present disclosure.

FIG. 5 is a schematic diagram illustrating a first scan circuit in some embodiments according to the present disclosure. Referring to FIG. 5, the first scan circuit is configured to receive a first start signal from a first start signal line STV1, which is configured to provide the first start signal to all scan units of the first scan circuit. In some embodiments, the first scan circuit is configured to drive the plurality of display sub-areas with a same driving frequency. In some embodiments, the first scan circuit is configured to provide control signals to the plurality of display sub-areas with a same frequency.

Figure 6:
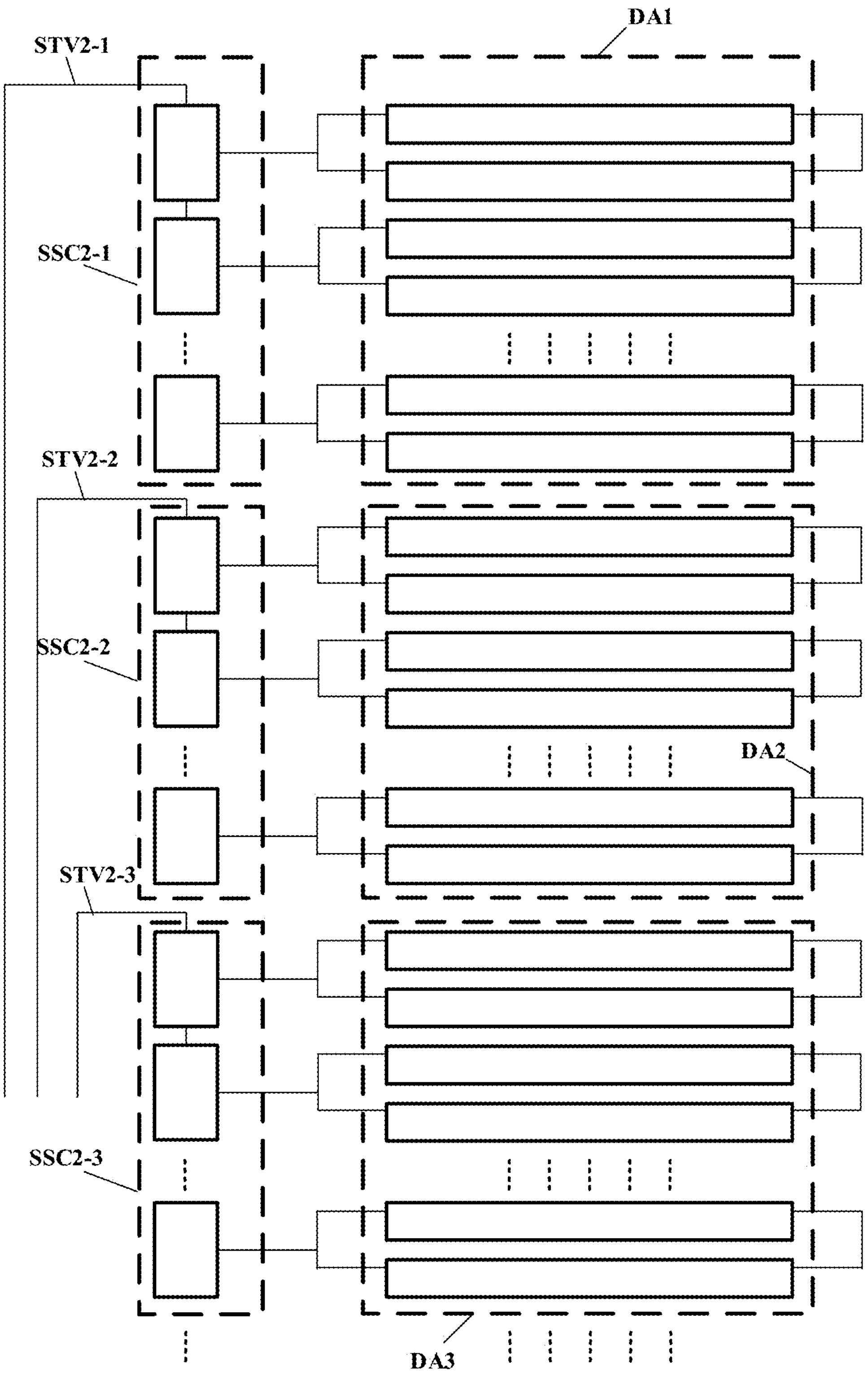
FIG. 6 is a schematic diagram illustrating a second scan circuit in some embodiments according to the present disclosure.

FIG. 6 is a schematic diagram illustrating a second scan circuit in some embodiments according to the present disclosure. Referring to FIG. 6, the second scan circuit in some embodiments includes a plurality of second scan sub-circuits, for example, a first respective second scan sub-circuit SSC2-1, a second respective second scan sub-circuit SSC2-2, and a third respective second scan sub-circuit SSC2-3. The display area DA includes a plurality of display sub-areas, for example, a first display sub-area DA1, a second display sub-area DA2, and a third display sub-area DA3. The plurality of display sub-areas (e.g., pixel driving circuits therein, and/or frame rate thereof) are independently controlled by the plurality of scan sub-circuits, respectively. For example, the first display sub-area DA1 is controlled by the first respective second scan sub-circuit SSC2-1, the second display sub-area DA2 is controlled by the second respective second scan sub-circuit SSC2-2, and the third display sub-area DA3 is controlled by the third respective second scan sub-circuit SSC2-3.

In some embodiments, the second scan circuit is configured to receive a plurality of start signals from a plurality of second start signal lines, respectively. Optionally, the plurality of second scan sub-circuits are configured to receive the plurality of start signals from a plurality of start signal lines, respectively. In one example, the plurality of start signal lines include a first respective second start signal line STV2-1, a second respective second start signal line STV2-2, and a third respective second start signal line STV2-3. The first respective second start signal line STV2-1 is configured to provide a first respective second start signal to the first respective second scan sub-circuit SSC2-1. The second respective second start signal line STV2-2 is configured to provide a second respective second start signal to the second respective second scan sub-circuit SSC2-2. The third respective second start signal line STV2-3 is configured to provide a third respective second start signal to the third respective second scan sub-circuit SSC2-2.

In some embodiments, at least two second scan sub-circuits of the plurality of second scan sub-circuits are configured to drive two display sub-areas of the plurality of display sub-areas with two different driving frequencies, respectively. Optionally, at least two second scan sub-circuits of the plurality of second scan sub-circuits are configured to drive two display sub-areas of the plurality of display sub-areas with two different driving frequencies in at least one frame of image, respectively. Optionally, the at least two second scan sub-circuits are two adjacent second scan sub-circuits.

In alternative embodiments, at least two second scan sub-circuits of the plurality of second scan sub-circuits are configured to drive two display sub-areas of the plurality of display sub-areas with a same driving frequency in at least one frame of image. Optionally, at least two second scan sub-circuits of the plurality of second scan sub-circuits are configured to drive two display sub-areas of the plurality of display sub-areas with a same driving frequency. Optionally, the at least two second scan sub-circuits are two adjacent second scan sub-circuits.

In some embodiments, at least two second scan sub-circuits of the plurality of second scan sub-circuits are configured to receive start signals from two start signal lines of the plurality of start signal lines with two different frequencies, respectively. Optionally, at least two second scan sub-circuits of the plurality of second scan sub-circuits are configured to receive start signals from two start signal lines of the plurality of start signal lines with two different frequencies in at least one frame of image, respectively. Optionally, the at least two second scan sub-circuits are two adjacent second scan sub-circuits.

In alternative embodiments, at least two second scan sub-circuits of the plurality of second scan sub-circuits are configured to receive start signals from two start signal lines of the plurality of start signal lines with a same frequency in at least one frame of image. Optionally, at least two second scan sub-circuits of the plurality of second scan sub-circuits are configured to receive start signals from two start signal lines of the plurality of start signal lines with a same frequency. Optionally, the at least two second scan sub-circuits are two adjacent second scan sub-circuits.

In some embodiments, at least two second scan sub-circuits of the plurality of second scan sub-circuits are configured to provide control signals to two display sub-areas of the plurality of display sub-areas with two different frequencies, respectively. Optionally, at least two second scan sub-circuits of the plurality of second scan sub-circuits are configured to provide control signals to two display sub-areas of the plurality of display sub-areas with two different frequencies in at least one frame of image, respectively. Optionally, the at least two second scan sub-circuits are two adjacent second scan sub-circuits.

In alternative embodiments, at least two second scan sub-circuits of the plurality of second scan sub-circuits are configured to provide control signals to two display sub-areas of the plurality of display sub-areas with a same frequency in at least one frame of image. Optionally, at least two second scan sub-circuits of the plurality of second scan sub-circuits are configured to provide control signals to two display sub-areas of the plurality of display sub-areas with a same frequency. Optionally, the at least two second scan sub-circuits are two adjacent second scan sub-circuits.

In some embodiments, the plurality of second scan sub-circuits include a first respective second scan sub-circuit SSC2-1 and a second respective second scan sub-circuit SSC2-2; and the display area DA includes a first display sub-area DA1 and a second display sub-area DA2. In some embodiments, the first respective second scan sub-circuit SSC2-1 and the second respective second scan sub-circuit SSC2-2 are configured to drive the first display sub-area DA1 and the second display sub-area DA2 with two different driving frequencies, respectively. Optionally, the first respective second scan sub-circuit SSC2-1 and the second respective second scan sub-circuit SSC2-2 are configured to drive the first display sub-area DA1 and the second display sub-area DA2 with two different driving frequencies in at least one frame of image, respectively. Optionally, the first respective second scan sub-circuit SSC2-1 and the second respective second scan sub-circuit SSC2-2 are two adjacent second scan sub-circuits.

In alternative embodiments, the first respective second scan sub-circuit SSC2-1 and the second respective second scan sub-circuit SSC2-2 are configured to drive the first display sub-area DA1 and the second display sub-area DA2 with a same driving frequency in at least one frame of image. Optionally, the first respective second scan sub-circuit SSC2-1 and the second respective second scan sub-circuit SSC2-2 are configured to drive the first display sub-area DA1 and the second display sub-area DA2 with a same driving frequency. Optionally, the first respective second scan sub-circuit SSC2-1 and the second respective second scan sub-circuit SSC2-2 are two adjacent second scan sub-circuits.

In some embodiments, the first respective second scan sub-circuit SSC2-1 and the second respective second scan sub-circuit SSC2-2 are configured to receive start signals from the first respective second start signal line STV2-1 and the second respective second start signal line STV2-2 with two different frequencies, respectively. Optionally, the first respective second scan sub-circuit SSC2-1 and the second respective second scan sub-circuit SSC2-2 are configured to receive start signals from the first respective second start signal line STV2-1 and the second respective second start signal line STV2-2 with two different frequencies in at least one frame of image, respectively.

In alternative embodiments, the first respective second scan sub-circuit SSC2-1 and the second respective second scan sub-circuit SSC2-2 are configured to receive start signals from the first respective second start signal line STV2-1 and the second respective second start signal line STV2-2 with a same frequency in at least one frame of image. Optionally, the first respective second scan sub-circuit SSC2-1 and the second respective second scan sub-circuit SSC2-2 are configured to receive start signals from the first respective second start signal line STV2-1 and the second respective second start signal line STV2-2 with a same frequency.

In some embodiments, the first respective second scan sub-circuit SSC2-1 and the second respective second scan sub-circuit SSC2-2 are configured to provide control signals to the first display sub-area DA1 and the second display sub-area DA2 with two different frequencies, respectively. Optionally, the first respective second scan sub-circuit SSC2-1 and the second respective second scan sub-circuit SSC2-2 are configured to provide control signals to the first display sub-area DA1 and the second display sub-area DA2 with two different frequencies in at least one frame of image, respectively.

In alternative embodiments, the first respective second scan sub-circuit SSC2-1 and the second respective second scan sub-circuit SSC2-2 are configured to provide control signals to the first display sub-area DA1 and the second display sub-area DA2 with a same frequency in at least one frame of image. Optionally, the first respective second scan sub-circuit SSC2-1 and the second respective second scan sub-circuit SSC2-2 are configured to provide control signals to the first display sub-area DA1 and the second display sub-area DA2 with a same frequency.

Referring to FIG. 6, a respective scan sub-circuit of the plurality of scan sub-circuit includes multiple stages. Each stage of the respective scan sub-circuit includes one scan unit configured to provide control signals to two rows of subpixels.

Figure 7:
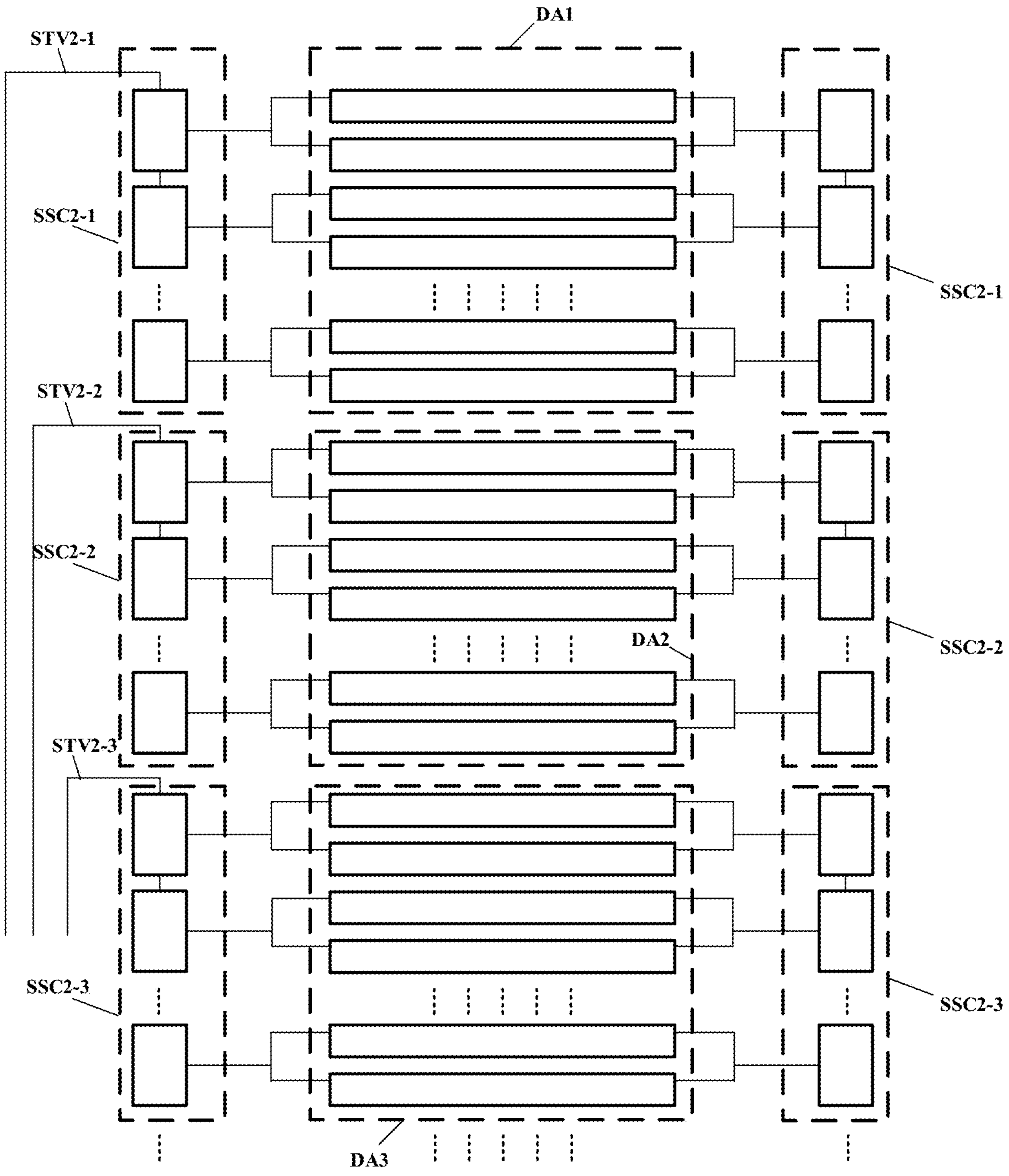
FIG. 7 is a schematic diagram illustrating a second scan circuit in some embodiments according to the present disclosure.

FIG. 7 is a schematic diagram illustrating a second scan circuit in some embodiments according to the present disclosure. The second scan circuit depicted in FIG. 7 is configured to control the plurality of display sub-areas in a manner similar to that described in FIG. 6 and associated texts. The second scan circuit depicted in FIG. 7 differs from the second scan circuit depicted in FIG. 6 in that, in the second scan circuit depicted in FIG. 7, each stage of the respective scan sub-circuit includes two scan units configured to provide control signals to two rows of subpixels. The two scan units are on two sides of the display area DA (see, e.g., the second side S2 and the fourth side S4 depicted in FIG. 2).

The second scan circuit in some embodiments is a second gate scanning signal generating circuit configured to generate second gate scanning signals for pixel driving circuits in the display area DA. In one particular example, the second scan circuit is a n-type scan circuit, e.g., a metal oxide transistor scan circuit.

Figure 8:
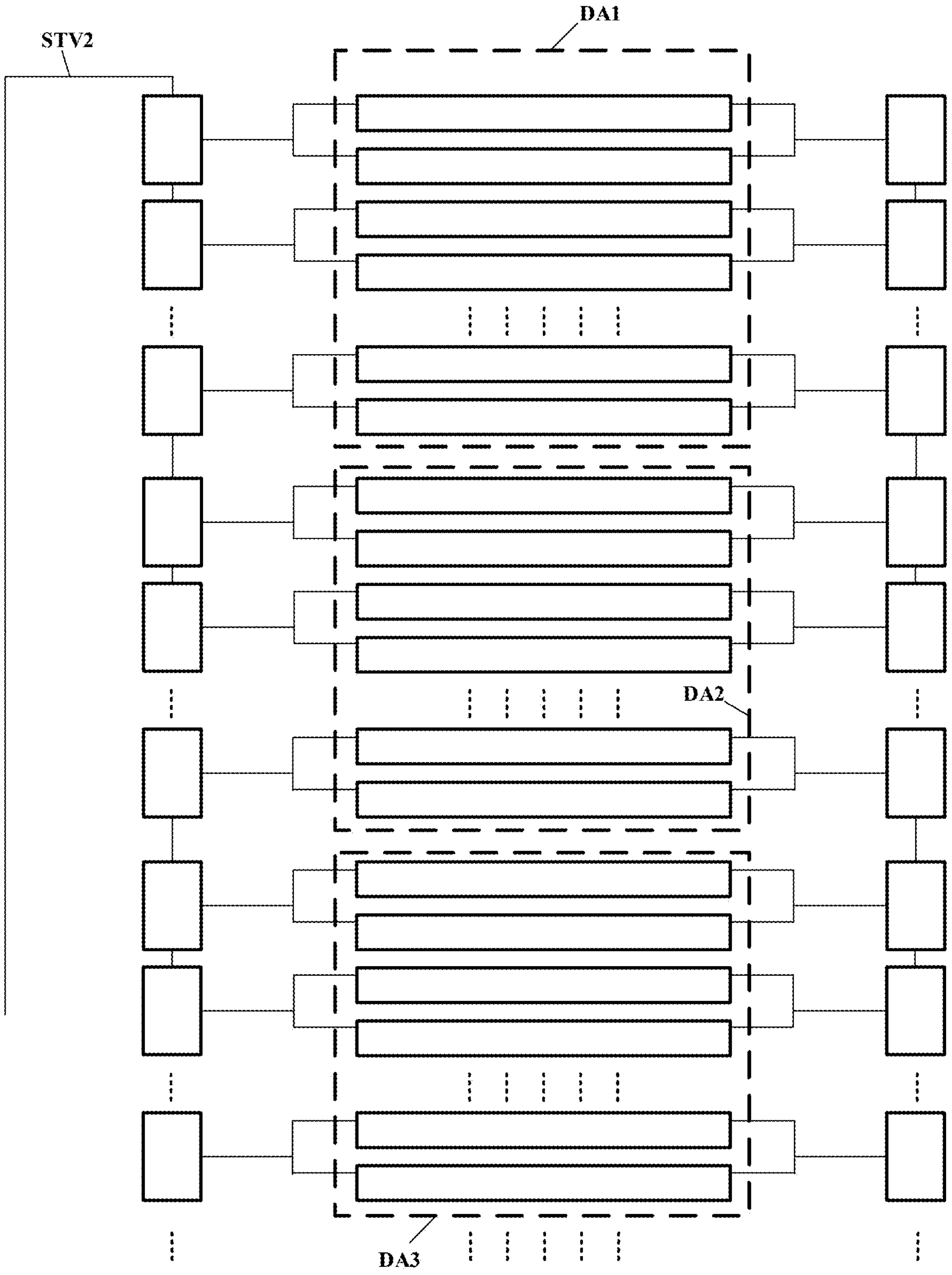
FIG. 8 is a schematic diagram illustrating a second scan circuit in some embodiments according to the present disclosure.

FIG. 8 is a schematic diagram illustrating a second scan circuit in some embodiments according to the present disclosure. Referring to FIG. 8, the second scan circuit is configured to receive a second start signal from a second start signal line STV2, which is configured to provide the second start signal to all scan units of the second scan circuit. In some embodiments, the second scan circuit is configured to drive the plurality of display sub-areas with a same driving frequency. In some embodiments, the second scan circuit is configured to provide control signals to the plurality of display sub-areas with a same frequency.

Figure 9:
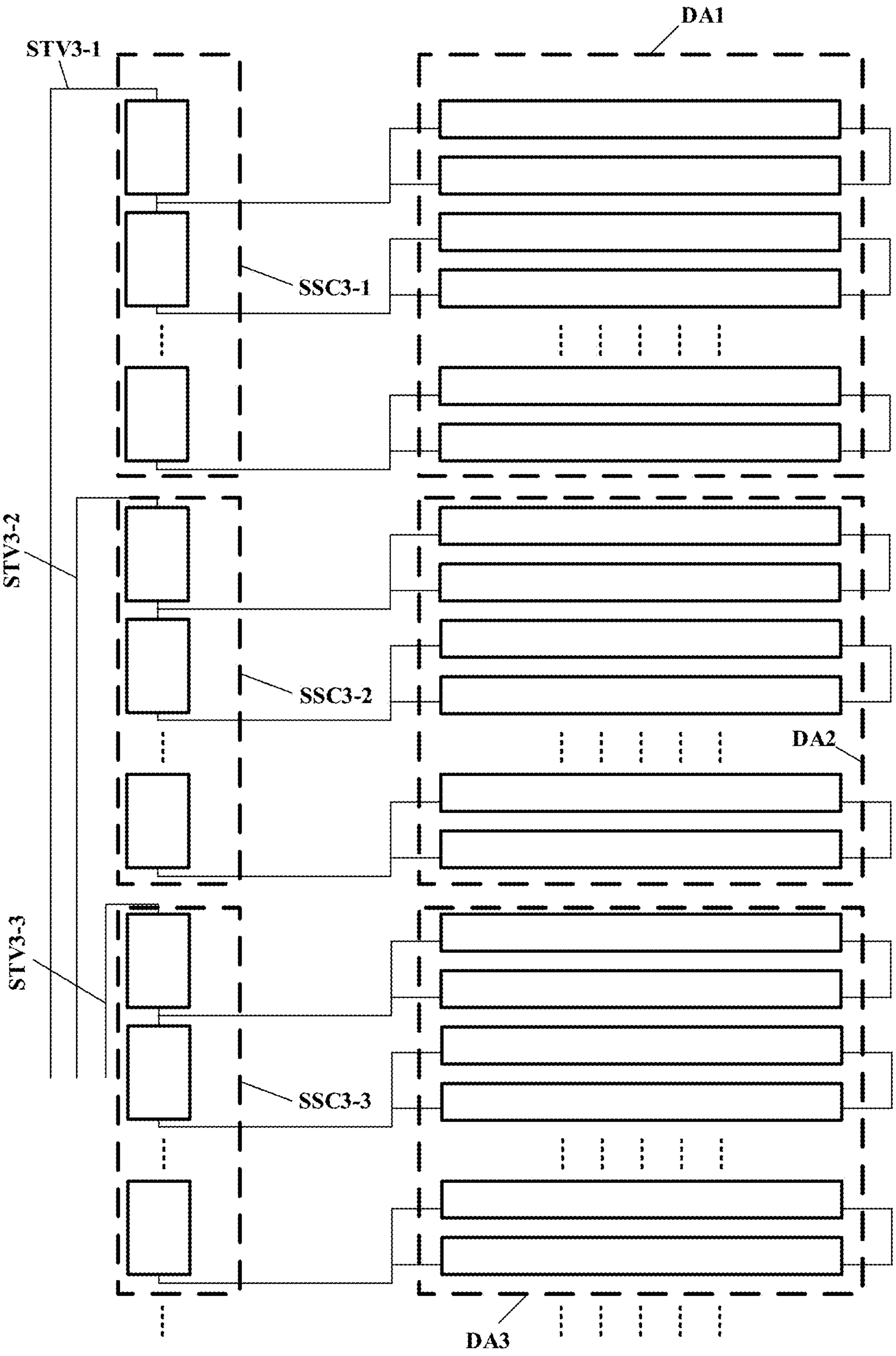
FIG. 9 is a schematic diagram illustrating a third scan circuit in some embodiments according to the present disclosure.

FIG. 9 is a schematic diagram illustrating a third scan circuit in some embodiments according to the present disclosure. Referring to FIG. 9, the third scan circuit in some embodiments includes a plurality of third scan sub-circuits, for example, a first respective third scan sub-circuit SSC3-1, a second respective third scan sub-circuit SSC3-2, and a third respective third scan sub-circuit SSC3-3. The display area DA includes a plurality of display sub-areas, for example, a first display sub-area DA1, a second display sub-area DA2, and a third display sub-area DA3. The plurality of display sub-areas (e.g., pixel driving circuits therein, and/or frame rate thereof) are independently controlled by the plurality of scan sub-circuits, respectively. For example, the first display sub-area DA1 is controlled by the first respective third scan sub-circuit SSC3-1, the second display sub-area DA2 is controlled by the second respective third scan sub-circuit SSC3-2, and the third display sub-area DA3 is controlled by the third respective third scan sub-circuit SSC3-3.

In some embodiments, the third scan circuit is configured to receive a plurality of start signals from a plurality of third start signal lines, respectively. Optionally, the plurality of third scan sub-circuits are configured to receive the plurality of start signals from a plurality of start signal lines, respectively. In one example, the plurality of start signal lines include a first respective third start signal line STV3-1, a second respective third start signal line STV3-2, and a third respective third start signal line STV3-3. The first respective third start signal line STV3-1 is configured to provide a first respective third start signal to the first respective third scan sub-circuit SSC3-1. The second respective third start signal line STV3-2 is configured to provide a second respective third start signal to the second respective third scan sub-circuit SSC3-2. The third respective third start signal line STV3-3 is configured to provide a third respective third start signal to the third respective third scan sub-circuit SSC3-2.

In some embodiments, at least two third scan sub-circuits of the plurality of third scan sub-circuits are configured to drive two display sub-areas of the plurality of display sub-areas with two different driving frequencies, respectively. Optionally, at least two third scan sub-circuits of the plurality of third scan sub-circuits are configured to drive two display sub-areas of the plurality of display sub-areas with two different driving frequencies in at least one frame of image, respectively. Optionally, the at least two third scan sub-circuits are two adjacent third scan sub-circuits.

In alternative embodiments, at least two third scan sub-circuits of the plurality of third scan sub-circuits are configured to drive two display sub-areas of the plurality of display sub-areas with a same driving frequency in at least one frame of image. Optionally, at least two third scan sub-circuits of the plurality of third scan sub-circuits are configured to drive two display sub-areas of the plurality of display sub-areas with a same driving frequency. Optionally, the at least two third scan sub-circuits are two adjacent third scan sub-circuits.

In some embodiments, at least two third scan sub-circuits of the plurality of third scan sub-circuits are configured to receive start signals from two start signal lines of the plurality of start signal lines with two different frequencies, respectively. Optionally, at least two third scan sub-circuits of the plurality of third scan sub-circuits are configured to receive start signals from two start signal lines of the plurality of start signal lines with two different frequencies in at least one frame of image, respectively. Optionally, the at least two third scan sub-circuits are two adjacent third scan sub-circuits.

In alternative embodiments, at least two third scan sub-circuits of the plurality of third scan sub-circuits are configured to receive start signals from two start signal lines of the plurality of start signal lines with a same frequency in at least one frame of image. Optionally, at least two third scan sub-circuits of the plurality of third scan sub-circuits are configured to receive start signals from two start signal lines of the plurality of start signal lines with a same frequency. Optionally, the at least two third scan sub-circuits are two adjacent third scan sub-circuits.

In some embodiments, at least two third scan sub-circuits of the plurality of third scan sub-circuits are configured to provide control signals to two display sub-areas of the plurality of display sub-areas with two different frequencies, respectively. Optionally, at least two third scan sub-circuits of the plurality of third scan sub-circuits are configured to provide control signals to two display sub-areas of the plurality of display sub-areas with two different frequencies in at least one frame of image, respectively. Optionally, the at least two third scan sub-circuits are two adjacent third scan sub-circuits.

In alternative embodiments, at least two third scan sub-circuits of the plurality of third scan sub-circuits are configured to provide control signals to two display sub-areas of the plurality of display sub-areas with a same frequency in at least one frame of image. Optionally, at least two third scan sub-circuits of the plurality of third scan sub-circuits are configured to provide control signals to two display sub-areas of the plurality of display sub-areas with a same frequency. Optionally, the at least two third scan sub-circuits are two adjacent third scan sub-circuits.

In some embodiments, the plurality of third scan sub-circuits include a first respective third scan sub-circuit SSC3-1 and a second respective third scan sub-circuit SSC3-2; and the display area DA includes a first display sub-area DA1 and a second display sub-area DA2. In some embodiments, the first respective third scan sub-circuit SSC3-1 and the second respective third scan sub-circuit SSC3-2 are configured to drive the first display sub-area DA1 and the second display sub-area DA2 with two different driving frequencies, respectively. Optionally, the first respective third scan sub-circuit SSC3-1 and the second respective third scan sub-circuit SSC3-2 are configured to drive the first display sub-area DA1 and the second display sub-area DA2 with two different driving frequencies in at least one frame of image, respectively. Optionally, the first respective third scan sub-circuit SSC3-1 and the second respective third scan sub-circuit SSC3-2 are two adjacent third scan sub-circuits.

In alternative embodiments, the first respective third scan sub-circuit SSC3-1 and the second respective third scan sub-circuit SSC3-2 are configured to drive the first display sub-area DA1 and the second display sub-area DA2 with a same driving frequency in at least one frame of image. Optionally, the first respective third scan sub-circuit SSC3-1 and the second respective third scan sub-circuit SSC3-2 are configured to drive the first display sub-area DA1 and the second display sub-area DA2 with a same driving frequency. Optionally, the first respective third scan sub-circuit SSC3-1 and the second respective third scan sub-circuit SSC3-2 are two adjacent third scan sub-circuits.

In some embodiments, the first respective third scan sub-circuit SSC3-1 and the second respective third scan sub-circuit SSC3-2 are configured to receive start signals from the first respective third start signal line STV3-1 and the second respective third start signal line STV3-2 with two different frequencies, respectively. Optionally, the first respective third scan sub-circuit SSC3-1 and the second respective third scan sub-circuit SSC3-2 are configured to receive start signals from the first respective third start signal line STV3-1 and the second respective third start signal line STV3-2 with two different frequencies in at least one frame of image, respectively.

In alternative embodiments, the first respective third scan sub-circuit SSC3-1 and the second respective third scan sub-circuit SSC3-2 are configured to receive start signals from the first respective third start signal line STV3-1 and the second respective third start signal line STV3-2 with a same frequency in at least one frame of image. Optionally, the first respective third scan sub-circuit SSC3-1 and the second respective third scan sub-circuit SSC3-2 are configured to receive start signals from the first respective third start signal line STV3-1 and the second respective third start signal line STV3-2 with a same frequency.

In some embodiments, the first respective third scan sub-circuit SSC3-1 and the second respective third scan sub-circuit SSC3-2 are configured to provide control signals to the first display sub-area DA1 and the second display sub-area DA2 with two different frequencies, respectively. Optionally, the first respective third scan sub-circuit SSC3-1 and the second respective third scan sub-circuit SSC3-2 are configured to provide control signals to the first display sub-area DA1 and the second display sub-area DA2 with two different frequencies in at least one frame of image, respectively.

In alternative embodiments, the first respective third scan sub-circuit SSC3-1 and the second respective third scan sub-circuit SSC3-2 are configured to provide control signals to the first display sub-area DA1 and the second display sub-area DA2 with a same frequency in at least one frame of image. Optionally, the first respective third scan sub-circuit SSC3-1 and the second respective third scan sub-circuit SSC3-2 are configured to provide control signals to the first display sub-area DA1 and the second display sub-area DA2 with a same frequency.

Referring to FIG. 9, a respective scan sub-circuit of the plurality of scan sub-circuit includes multiple stages. Each stage of the respective scan sub-circuit includes one scan unit configured to provide control signals to two rows of subpixels.

The third scan circuit in some embodiments is a light emitting control signal generating circuit configured to generate light emitting control signals for pixel driving circuits in the display area DA.

Figure 10:
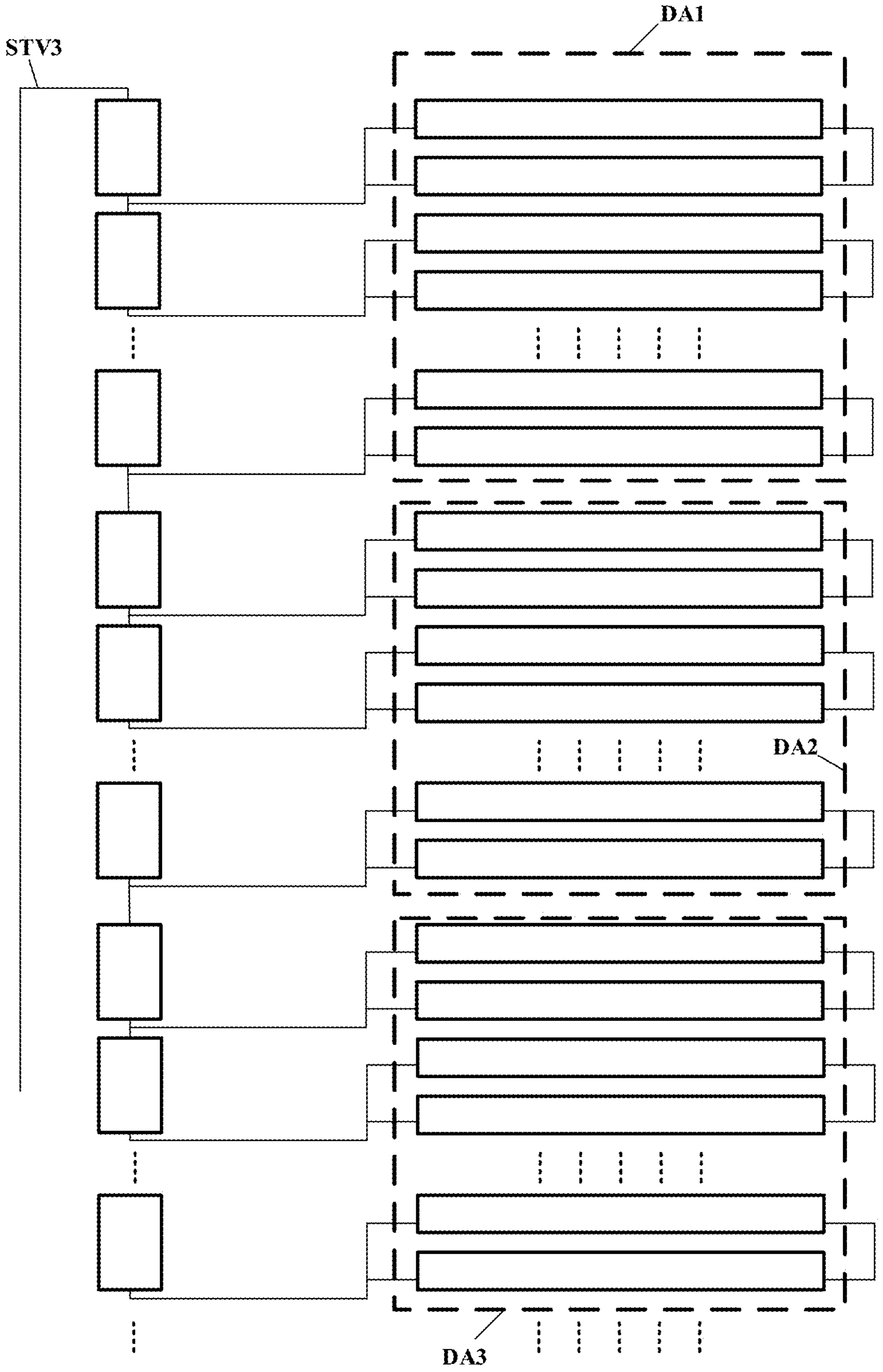
FIG. 10 is a schematic diagram illustrating a third scan circuit in some embodiments according to the present disclosure.

FIG. 10 is a schematic diagram illustrating a third scan circuit in some embodiments according to the present disclosure. Referring to FIG. 10, the third scan circuit is configured to receive a third start signal from a third start signal line STV3, which is configured to provide the third start signal to all scan units of the third scan circuit. In some embodiments, the third scan circuit is configured to drive the plurality of display sub-areas with a same driving frequency. In some embodiments, the third scan circuit is configured to provide control signals to the plurality of display sub-areas with a same frequency.

Figure 11:
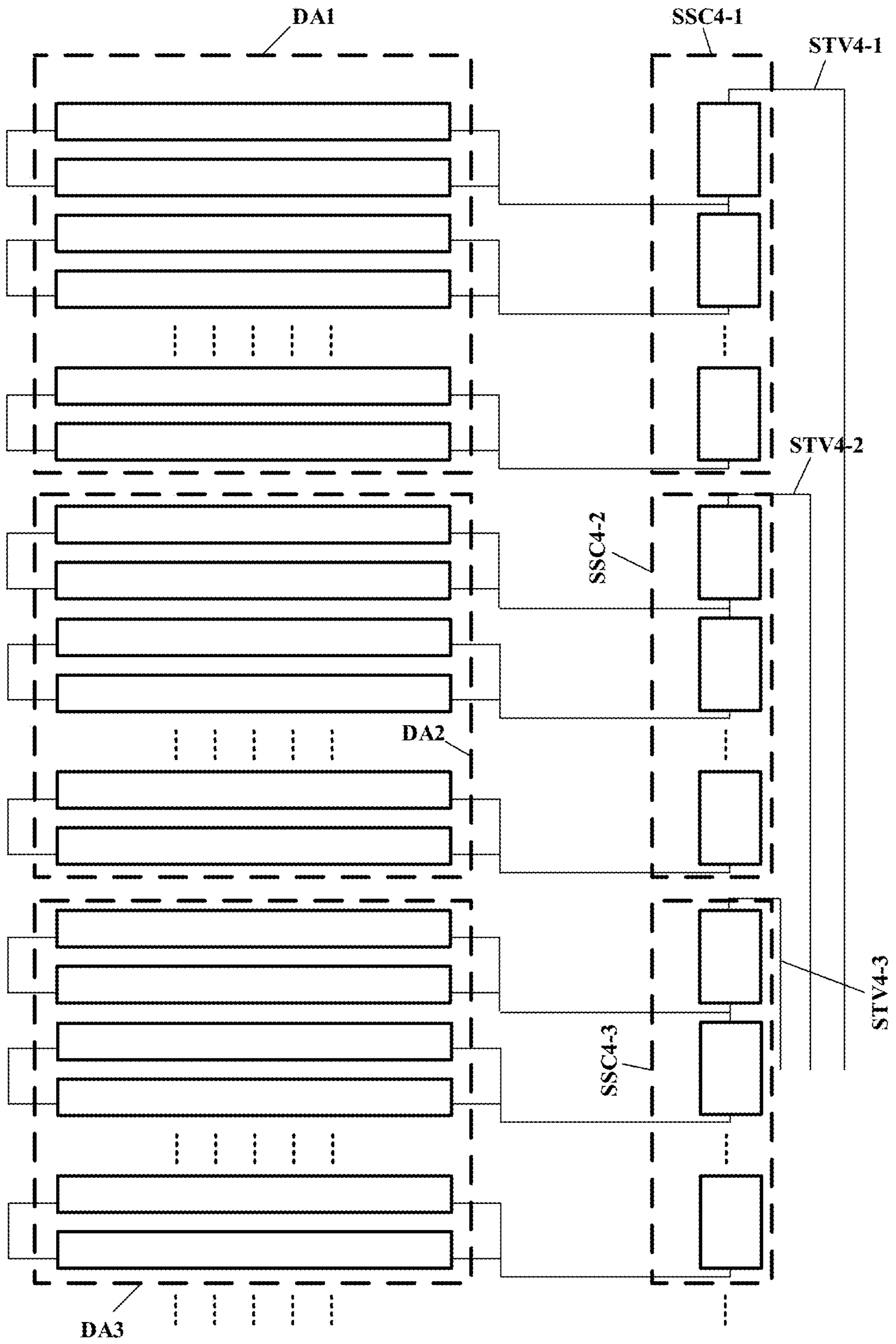
FIG. 11 is a schematic diagram illustrating a fourth scan circuit in some embodiments according to the present disclosure.

FIG. 11 is a schematic diagram illustrating a fourth scan circuit in some embodiments according to the present disclosure. Referring to FIG. 11, the fourth scan circuit in some embodiments includes a plurality of fourth scan sub-circuits, for example, a first respective fourth scan sub-circuit SSC4-1, a second respective fourth scan sub-circuit SSC4-2, and a third respective fourth scan sub-circuit SSC4-3. The display area DA includes a plurality of display sub-areas, for example, a first display sub-area DA1, a second display sub-area DA2, and a third display sub-area DA3. The plurality of display sub-areas (e.g., pixel driving circuits therein, and/or frame rate thereof) are independently controlled by the plurality of scan sub-circuits, respectively. For example, the first display sub-area DA1 is controlled by the first respective fourth scan sub-circuit SSC4-1, the second display sub-area DA2 is controlled by the second respective fourth scan sub-circuit SSC4-2, and the third display sub-area DA3 is controlled by the third respective fourth scan sub-circuit SSC4-3.

In some embodiments, the fourth scan circuit is configured to receive a plurality of start signals from a plurality of fourth start signal lines, respectively. Optionally, the plurality of fourth scan sub-circuits are configured to receive the plurality of start signals from a plurality of start signal lines, respectively. In one example, the plurality of start signal lines include a first respective fourth start signal line STV4-1, a second respective fourth start signal line STV4-2, and a third respective fourth start signal line STV4-3. The first respective fourth start signal line STV4-1 is configured to provide a first respective fourth start signal to the first respective fourth scan sub-circuit SSC4-1. The second respective fourth start signal line STV4-2 is configured to provide a second respective fourth start signal to the second respective fourth scan sub-circuit SSC4-2. The third respective fourth start signal line STV4-3 is configured to provide a third respective fourth start signal to the third respective fourth scan sub-circuit SSC4-2.

In some embodiments, at least two fourth scan sub-circuits of the plurality of fourth scan sub-circuits are configured to drive two display sub-areas of the plurality of display sub-areas with two different driving frequencies, respectively. Optionally, at least two fourth scan sub-circuits of the plurality of fourth scan sub-circuits are configured to drive two display sub-areas of the plurality of display sub-areas with two different driving frequencies in at least one frame of image, respectively. Optionally, the at least two fourth scan sub-circuits are two adjacent fourth scan sub-circuits.

In alternative embodiments, at least two fourth scan sub-circuits of the plurality of fourth scan sub-circuits are configured to drive two display sub-areas of the plurality of display sub-areas with a same driving frequency in at least one frame of image. Optionally, at least two fourth scan sub-circuits of the plurality of fourth scan sub-circuits are configured to drive two display sub-areas of the plurality of display sub-areas with a same driving frequency. Optionally, the at least two fourth scan sub-circuits are two adjacent fourth scan sub-circuits.

In some embodiments, at least two fourth scan sub-circuits of the plurality of fourth scan sub-circuits are configured to receive start signals from two start signal lines of the plurality of start signal lines with two different frequencies, respectively. Optionally, at least two fourth scan sub-circuits of the plurality of fourth scan sub-circuits are configured to receive start signals from two start signal lines of the plurality of start signal lines with two different frequencies in at least one frame of image, respectively. Optionally, the at least two fourth scan sub-circuits are two adjacent fourth scan sub-circuits.

In alternative embodiments, at least two fourth scan sub-circuits of the plurality of fourth scan sub-circuits are configured to receive start signals from two start signal lines of the plurality of start signal lines with a same frequency in at least one frame of image. Optionally, at least two fourth scan sub-circuits of the plurality of fourth scan sub-circuits are configured to receive start signals from two start signal lines of the plurality of start signal lines with a same frequency. Optionally, the at least two fourth scan sub-circuits are two adjacent fourth scan sub-circuits.

In some embodiments, at least two fourth scan sub-circuits of the plurality of fourth scan sub-circuits are configured to provide control signals to two display sub-areas of the plurality of display sub-areas with two different frequencies, respectively. Optionally, at least two fourth scan sub-circuits of the plurality of fourth scan sub-circuits are configured to provide control signals to two display sub-areas of the plurality of display sub-areas with two different frequencies in at least one frame of image, respectively. Optionally, the at least two fourth scan sub-circuits are two adjacent fourth scan sub-circuits.

In alternative embodiments, at least two fourth scan sub-circuits of the plurality of fourth scan sub-circuits are configured to provide control signals to two display sub-areas of the plurality of display sub-areas with a same frequency in at least one frame of image. Optionally, at least two fourth scan sub-circuits of the plurality of fourth scan sub-circuits are configured to provide control signals to two display sub-areas of the plurality of display sub-areas with a same frequency. Optionally, the at least two fourth scan sub-circuits are two adjacent fourth scan sub-circuits.

In some embodiments, the plurality of fourth scan sub-circuits include a first respective fourth scan sub-circuit SSC4-1 and a second respective fourth scan sub-circuit SSC4-2; and the display area DA includes a first display sub-area DA1 and a second display sub-area DA2. In some embodiments, the first respective fourth scan sub-circuit SSC4-1 and the second respective fourth scan sub-circuit SSC4-2 are configured to drive the first display sub-area DA1 and the second display sub-area DA2 with two different driving frequencies, respectively. Optionally, the first respective fourth scan sub-circuit SSC4-1 and the second respective fourth scan sub-circuit SSC4-2 are configured to drive the first display sub-area DA1 and the second display sub-area DA2 with two different driving frequencies in at least one frame of image, respectively. Optionally, the first respective fourth scan sub-circuit SSC4-1 and the second respective fourth scan sub-circuit SSC4-2 are two adjacent fourth scan sub-circuits.

In alternative embodiments, the first respective fourth scan sub-circuit SSC4-1 and the second respective fourth scan sub-circuit SSC4-2 are configured to drive the first display sub-area DA1 and the second display sub-area DA2 with a same driving frequency in at least one frame of image. Optionally, the first respective fourth scan sub-circuit SSC4-1 and the second respective fourth scan sub-circuit SSC4-2 are configured to drive the first display sub-area DA1 and the second display sub-area DA2 with a same driving frequency. Optionally, the first respective fourth scan sub-circuit SSC4-1 and the second respective fourth scan sub-circuit SSC4-2 are two adjacent fourth scan sub-circuits.

In some embodiments, the first respective fourth scan sub-circuit SSC4-1 and the second respective fourth scan sub-circuit SSC4-2 are configured to receive start signals from the first respective fourth start signal line STV4-1 and the second respective fourth start signal line STV4-2 with two different frequencies, respectively. Optionally, the first respective fourth scan sub-circuit SSC4-1 and the second respective fourth scan sub-circuit SSC4-2 are configured to receive start signals from the first respective fourth start signal line STV4-1 and the second respective fourth start signal line STV4-2 with two different frequencies in at least one frame of image, respectively.

In alternative embodiments, the first respective fourth scan sub-circuit SSC4-1 and the second respective fourth scan sub-circuit SSC4-2 are configured to receive start signals from the first respective fourth start signal line STV4-1 and the second respective fourth start signal line STV4-2 with a same frequency in at least one frame of image. Optionally, the first respective fourth scan sub-circuit SSC4-1 and the second respective fourth scan sub-circuit SSC4-2 are configured to receive start signals from the first respective fourth start signal line STV4-1 and the second respective fourth start signal line STV4-2 with a same frequency.

In some embodiments, the first respective fourth scan sub-circuit SSC4-1 and the second respective fourth scan sub-circuit SSC4-2 are configured to provide control signals to the first display sub-area DA1 and the second display sub-area DA2 with two different frequencies, respectively. Optionally, the first respective fourth scan sub-circuit SSC4-1 and the second respective fourth scan sub-circuit SSC4-2 are configured to provide control signals to the first display sub-area DA1 and the second display sub-area DA2 with two different frequencies in at least one frame of image, respectively.

In alternative embodiments, the first respective fourth scan sub-circuit SSC4-1 and the second respective fourth scan sub-circuit SSC4-2 are configured to provide control signals to the first display sub-area DA1 and the second display sub-area DA2 with a same frequency in at least one frame of image. Optionally, the first respective fourth scan sub-circuit SSC4-1 and the second respective fourth scan sub-circuit SSC4-2 are configured to provide control signals to the first display sub-area DA1 and the second display sub-area DA2 with a same frequency.

Referring to FIG. 11, a respective scan sub-circuit of the plurality of scan sub-circuit includes multiple stages. Each stage of the respective scan sub-circuit includes one scan unit configured to provide control signals to two rows of subpixels.

In some embodiments, the fourth scan circuit is a reset control signal generating circuit configured to generate reset control signals for pixel driving circuits in the display area DA.

In alternative embodiments, the fourth scan circuit is a sensing control signal generating circuit configured to generate sensing control signals for pixel driving circuits in the display area DA.

Figure 12:
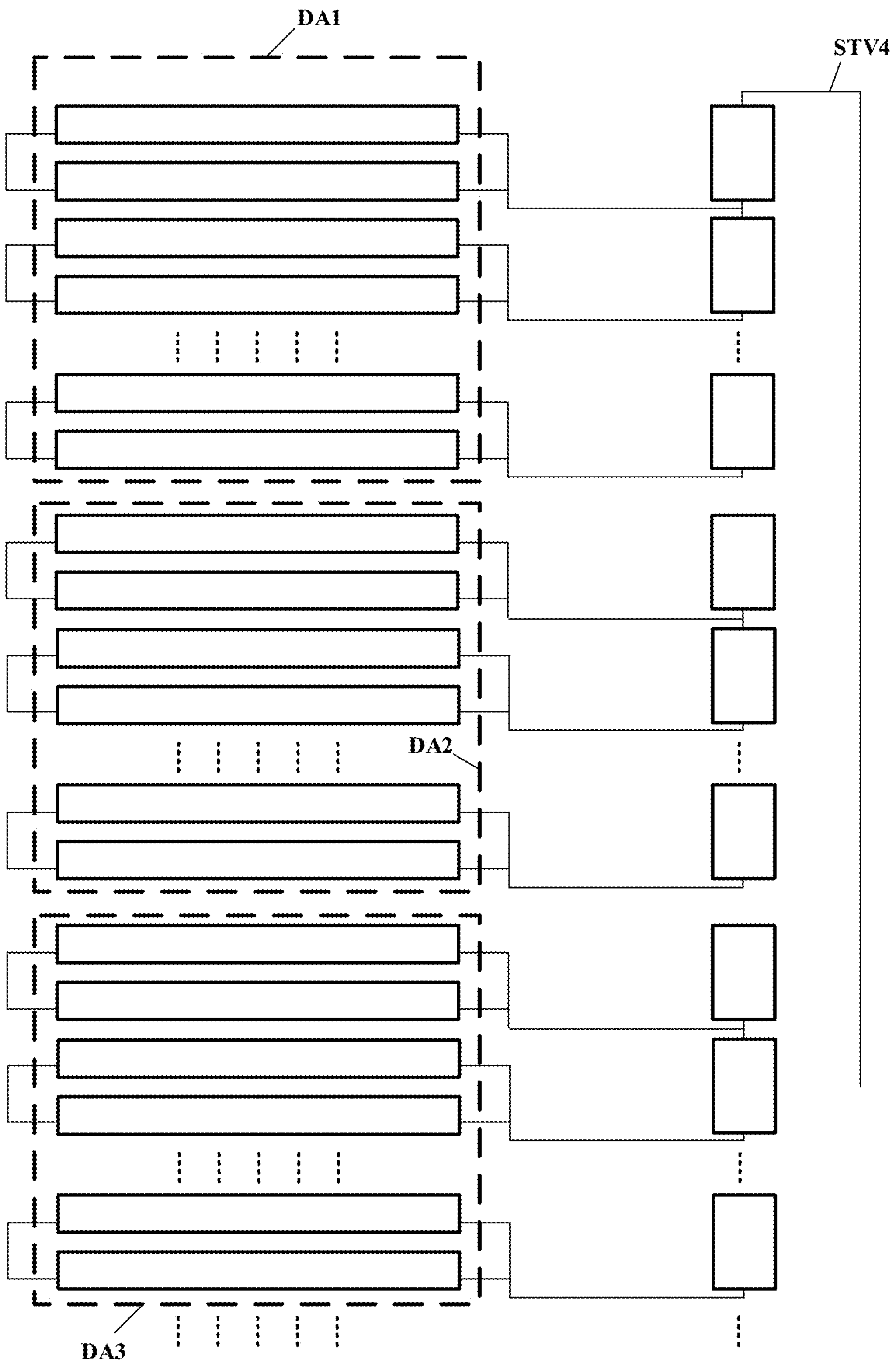
FIG. 12 is a schematic diagram illustrating a fourth scan circuit in some embodiments according to the present disclosure.

FIG. 12 is a schematic diagram illustrating a fourth scan circuit in some embodiments according to the present disclosure. Referring to FIG. 12, the fourth scan circuit is configured to receive a fourth start signal from a fourth start signal line STV4, which is configured to provide the fourth start signal to all scan units of the fourth scan circuit. In some embodiments, the fourth scan circuit is configured to drive the plurality of display sub-areas with a same driving frequency. In some embodiments, the fourth scan circuit is configured to provide control signals to the plurality of display sub-areas with a same frequency.

Figure 13:
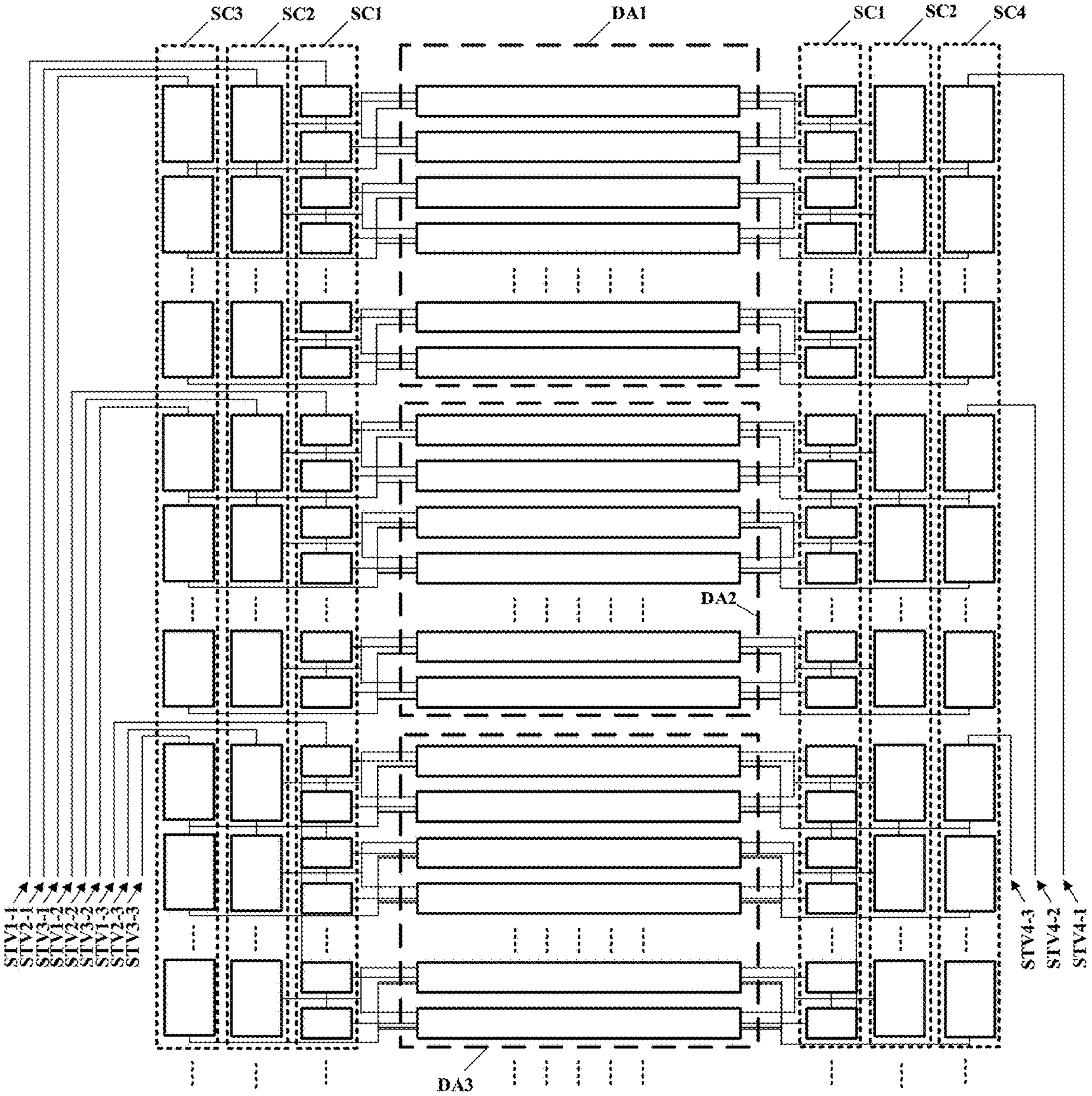
FIG. 13 is a schematic diagram illustrating one or more scan circuits in some embodiments according to the present disclosure.

Accordingly, the present disclosure provides a driving circuit comprising one or more scan circuits. FIG. 13 is a schematic diagram illustrating one or more scan circuits in some embodiments according to the present disclosure. Referring to FIG. 13, the one or more scan circuit in some embodiments include a first scan circuit SC1, a second scan circuit SC2, a third scan circuit SC3, and a fourth scan circuit SC4. In the particular example depicted in FIG. 13, the first scan circuit SC1 is the same as that depicted in FIG. 4, the second scan circuit SC2 is the same as that depicted in FIG. 7, the third scan circuit SC3 is the same as that depicted in FIG. 9, and the fourth scan circuit SC4 is the same as that depicted in FIG. 11.

In some embodiments, the display area includes N number of display sub-areas. For example, the display area includes a first display sub-area DA1, a second display sub-area DA2, and a third display sub-area DA3. In some embodiments, the first scan circuit SC1 includes N number of first scan sub-circuits configured to receive N number of first start signals from N number of first start signal lines, respectively. For example, the first scan circuit SC1 includes a first respective first scan sub-circuit SSC1-1 configured to receive a first respective first start signal from a first respective first start signal line STV1-1, a second respective first scan sub-circuit SSC1-2 configured to receive a second respective first start signal from a second respective first start signal line STV1-2, and a third respective first scan sub-circuit SSC1-3 configured to receive a third respective first start signal from a third respective first start signal line STV1-3.

In some embodiments, the second scan circuit SC2 includes N number of second scan sub-circuits configured to receive N number of second start signals from N number of second start signal lines, respectively. For example, the second scan circuit SC2 includes a first respective second scan sub-circuit SSC2-1 configured to receive a first respective second start signal from a first respective second start signal line STV2-1, a second respective second scan sub-circuit SSC2-2 configured to receive a second respective second start signal from a second respective second start signal line STV2-2, and a third respective second scan sub-circuit SSC2-3 configured to receive a third respective second start signal from a third respective second start signal line STV2-3.

In some embodiments, the third scan circuit SC3 includes N number of third scan sub-circuits configured to receive N number of third start signals from N number of third start signal lines, respectively. For example, the third scan circuit SC3 includes a first respective third scan sub-circuit SSC3-1 configured to receive a first respective third start signal from a first respective third start signal line STV3-1, a second respective third scan sub-circuit SSC3-2 configured to receive a second respective third start signal from a second respective third start signal line STV3-2, and a third respective third scan sub-circuit SSC3-3 configured to receive a third respective third start signal from a third respective third start signal line STV3-3.

In some embodiments, the fourth scan circuit SC4 includes N number of fourth scan sub-circuits configured to receive N number of fourth start signals from N number of fourth start signal lines, respectively. For example, the fourth scan circuit SC4 includes a first respective fourth scan sub-circuit SSC4-1 configured to receive a first respective fourth start signal from a first respective fourth start signal line STV4-1, a second respective fourth scan sub-circuit SSC4-2 configured to receive a second respective fourth start signal from a second respective fourth start signal line STV4-2, and a third respective fourth scan sub-circuit SSC4-3 configured to receive a third respective fourth start signal from a third respective fourth start signal line STV4-3.

As discussed above in the context of FIG. 3 to FIG. 12, the one or more scan circuits may be configured to drive the plurality of display sub-areas with various appropriate driving frequencies.

Figure 14:
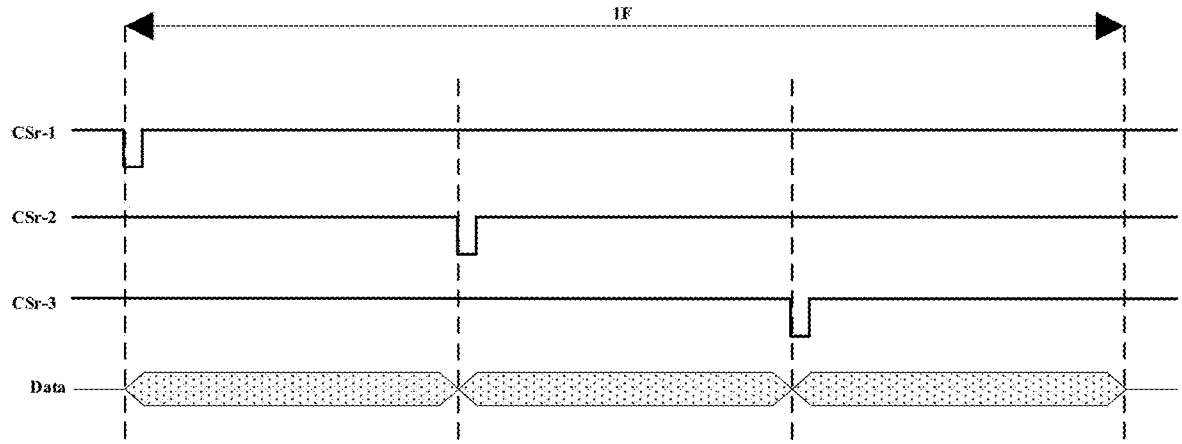
FIG. 14 is a timing diagram illustrating the operation of a respective scan circuit in some embodiments according to the present disclosure.

FIG. 14 is a timing diagram illustrating the operation of a respective scan circuit in some embodiments according to the present disclosure. FIG. 14 shows the operation of the respective scan circuit in one frame of image, e.g., a first frame of image 1F. The respective scan circuit may be any one of the first scan circuit SC1, the second scan circuit SC2, the third scan circuit SC3, and the fourth scan circuit SC4 depicted in FIG. 13. In some embodiments, the respective scan circuit includes N number of respective scan sub-circuits configured to receive N number of respective start signals from N number of respective start signal lines, respectively. For example, the N number of respective start signals may include a first respective start signal, a second respective start signal, and a third respective start signal.

Referring to FIG. 14, the N number of respective scan sub-circuits are configured to output N number of respective control signals to N number of display sub-areas. The N number of respective control signals may include a first respective control signal CSr-1, a second respective control signal CSr-2 and a third respective control signal CSr-3. In one example, the N number of respective control signals are control signals for controlling data write transistors in the display area. For example, when a first respective control signal CSr-1 is provided to a data write transistor in a first display sub-area, data signals transmit through the data write transistor in the first display sub-area, as shown in FIG. 14. When a second respective control signal CSr-2 is provided to a data write transistor in a second display sub-area, data signals transmit through the data write transistor in the second display sub-area. When a third respective control signal CSr-3 is provided to a data write transistor in a third display sub-area, data signals transmit through the data write transistor in the third display sub-area.

FIG. 14 depicts an operation of the respective scan circuit in a first mode. In the first mode, at least two respective scan sub-circuits of the plurality of respective scan sub-circuits are configured to provide control signals to two display sub-areas of the plurality of display sub-areas with a same frequency in at least one frame of image. Optionally, at least two respective scan sub-circuits of the plurality of respective scan sub-circuits are configured to provide control signals to two display sub-areas of the plurality of display sub-areas with a same frequency. Optionally, the at least two respective scan sub-circuits are two adjacent respective scan sub-circuits. Optionally, in the first mode, the plurality of respective scan sub-circuits are configured to provide control signals to the plurality of display sub-areas with a same frequency.

Figure 15:
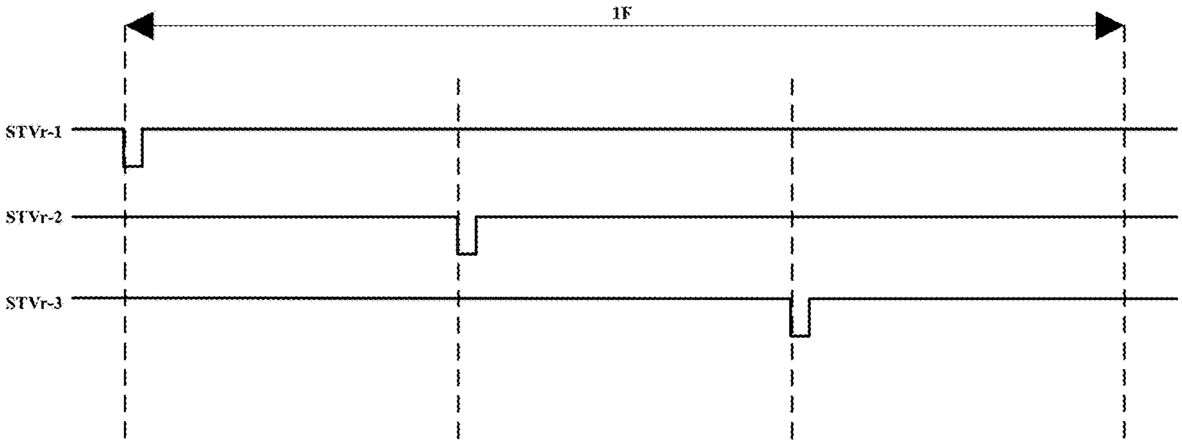
FIG. 15 is a timing diagram illustrating the operation of a respective scan circuit in some embodiments according to the present disclosure.

FIG. 15 is a timing diagram illustrating the operation of a respective scan circuit in some embodiments according to the present disclosure. FIG. 15 shows the operation of the respective scan circuit in one frame of image, e.g., a first frame of image 1F. The respective scan circuit may be any one of the first scan circuit SC1, the second scan circuit SC2, the third scan circuit SC3, and the fourth scan circuit SC4 depicted in FIG. 13. In some embodiments, the respective scan circuit includes N number of respective scan sub-circuits configured to receive N number of respective start signals from N number of respective start signal lines, respectively. For example, the N number of respective start signals may include a first respective start signal STVr-1, a second respective start signal STVr-2, and a third respective start signal STVr-3.

Referring to FIG. 15, the N number of respective scan sub-circuits are configured to receive N number of respective start signals from N number of start signal lines. The N number of respective start signals may include a first respective start signal STVr-1, a second respective start signal STVr-2 and a third respective start signal STVr-3. For example, when a first respective start signal STVr-1 is provided to a first respective scan sub-circuit, the first respective scan sub-circuit is configured to output control signals. When a second respective start signal STVr-2 is provided to a second respective scan sub-circuit, the second respective scan sub-circuit is configured to output control signals. When a third respective start signal STVr-3 is provided to a third respective scan sub-circuit, the third respective scan sub-circuit is configured to output control signals.

FIG. 15 depicts an operation of the respective scan circuit in a first mode. In the first mode, at least two respective scan sub-circuits of the plurality of respective scan sub-circuits are configured to receive start signals from two start signal lines of the plurality of start signal lines with two different frequencies, respectively. Optionally, at least two respective scan sub-circuits of the plurality of respective scan sub-circuits are configured to receive start signals from two start signal lines of the plurality of start signal lines with a same in at least one frame of image. Optionally, the at least two respective scan sub-circuits are two adjacent respective scan sub-circuits. Optionally, in the first mode, the plurality of respective scan sub-circuits are configured to receive start signals from the plurality of start signal lines with a same frequency.

In one example, in the first mode, the display panel driven by the driving circuit according to the present disclosure has a frame rate in a range of 60 Hz to 90 Hz.

Figure 16:
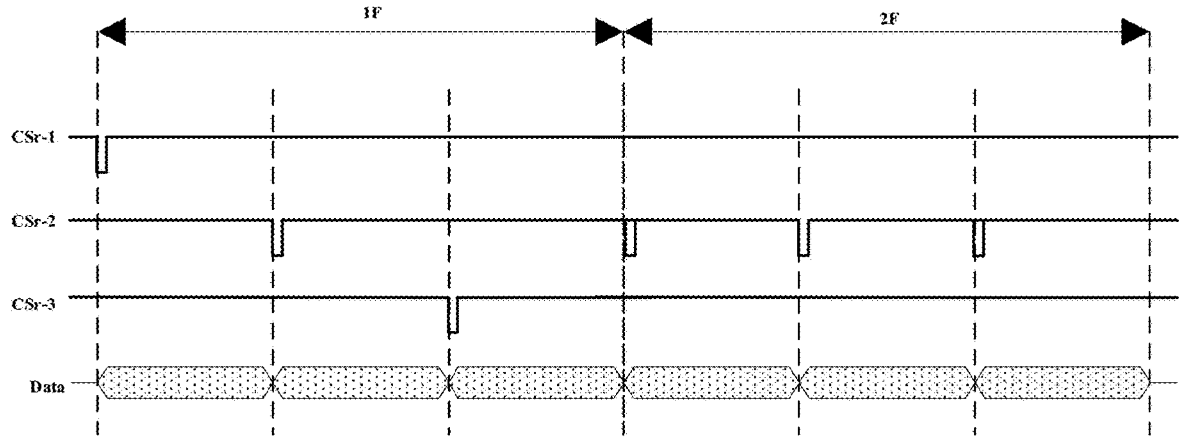
FIG. 16 is a timing diagram illustrating the operation of a respective scan circuit in some embodiments according to the present disclosure.

FIG. 16 is a timing diagram illustrating the operation of a respective scan circuit in some embodiments according to the present disclosure. FIG. 16 shows the operation of the respective scan circuit in two frames of image, e.g., a first frame of image 1F and a second frame of image 2F. The respective scan circuit may be any one of the first scan circuit SC1, the second scan circuit SC2, the third scan circuit SC3, and the fourth scan circuit SC4 depicted in FIG. 13. In some embodiments, the respective scan circuit includes N number of respective scan sub-circuits configured to receive N number of respective start signals from N number of respective start signal lines, respectively. For example, the N number of respective start signals may include a first respective start signal, a second respective start signal, and a third respective start signal.

FIG. 16 depicts an operation of the respective scan circuit in a second mode. In the second mode, the operation of the respective scan circuit in the first frame of image 1F is the same as that depicted in FIG. 14. The operation of the respective scan circuit in the second frame of image 2F is different from that depicted in FIG. 14. In the second frame of image 2F, at least one of the N number of respective scan sub-circuits is configured to output control signals at a lower frequency as compared to a frequency of outputting control signals in the first frame of image 1F by the at least one of the N number of respective scan sub-circuits, and at least another one of the N number of respective scan sub-circuits is configured to output control signals at a higher frequency as compared to a frequency of outputting control signals in the first frame of image 1F by the at least another one of the N number of respective scan sub-circuits. Optionally, in the second frame of image 2F, the at least one of the N number of respective scan sub-circuits is not configured to output control signals (frequency=0), and the at least another one of the N number of respective scan sub-circuits is configured to output control signals at a higher frequency as compared to a frequency of outputting control signals in the first frame of image 1F by the at least another one of the N number of respective scan sub-circuits.

As shown in FIG. 16, in the second frame of image 2F, the first respective control signal CSr-1 is not output to the first display sub-area, and the third respective control signal CSr-3 is not output to the third display sub-area. The first display sub-area is configured to maintain the image displayed in the first display sub-area in the first frame of image. The third display sub-area is configured to maintain the image displayed in the third display sub-area in the first frame of image.

As shown in FIG. 16, in the second frame of image 2F, the second respective control signal CSr-2 is output at a frequency that is three times of a frequency by which the second respective control signal CSr-2 is output in the first frame of image 1F. Accordingly, the second display sub-area achieves a higher frame rate as compared to the first display sub-area and the third display sub-area.

FIG. 16 depicts an operation of the respective scan circuit in a second mode. In the second mode, at least two respective scan sub-circuits of the plurality of respective scan sub-circuits are configured to provide control signals to two display sub-areas of the plurality of display sub-areas with two different frequencies, respectively. Optionally, at least two respective scan sub-circuits of the plurality of respective scan sub-circuits are configured to provide control signals to two display sub-areas of the plurality of display sub-areas with two different frequencies in at least one frame of image, respectively. Optionally, the at least two respective scan sub-circuits are two adjacent respective scan sub-circuits.

Figure 17:
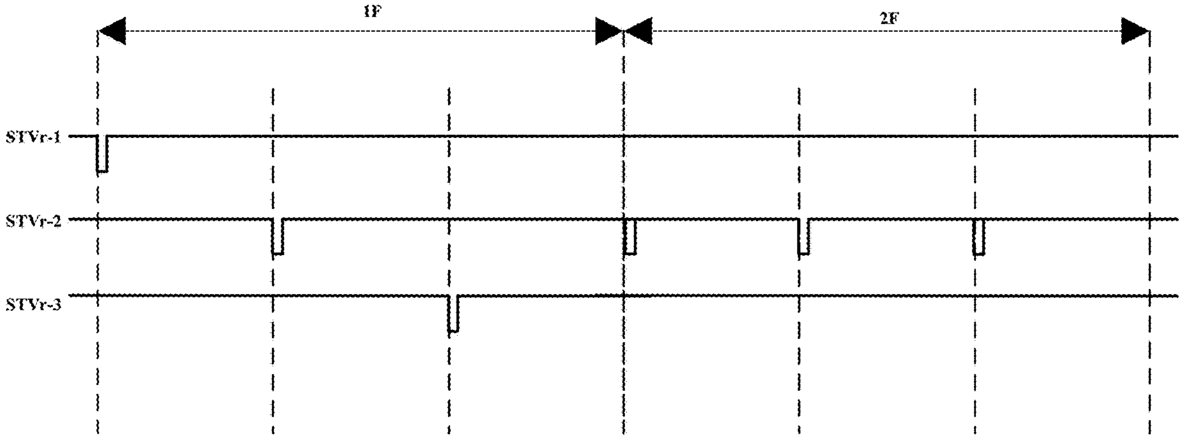
FIG. 17 is a timing diagram illustrating the operation of a respective scan circuit in some embodiments according to the present disclosure.

FIG. 17 is a timing diagram illustrating the operation of a respective scan circuit in some embodiments according to the present disclosure. FIG. 17 depicts an operation of the respective scan circuit in a second mode. In the second mode, the operation of the respective scan circuit in the first frame of image 1F is the same as that depicted in FIG. 15. The operation of the respective scan circuit in the second frame of image 2F is different from that depicted in FIG. 15. In the second frame of image 2F, at least one of the N number of respective scan sub-circuits is configured to receive start signals at a lower frequency as compared to a frequency of receiving start signals in the first frame of image 1F by the at least one of the N number of respective scan sub-circuits, and at least another one of the N number of respective scan sub-circuits is configured to receive start signals at a higher frequency as compared to a frequency of receiving start signals in the first frame of image 1F by the at least another one of the N number of respective scan sub-circuits. Optionally, in the second frame of image 2F, the at least one of the N number of respective scan sub-circuits is not configured to receive start signals (frequency=0), and the at least another one of the N number of respective scan sub-circuits is configured to receive start signals at a higher frequency as compared to a frequency of receiving start signals in the first frame of image 1F by the at least another one of the N number of respective scan sub-circuits.

As shown in FIG. 17, in the second frame of image 2F, the first respective start signal STVr-1 is provided to the first respective scan sub-circuit, and the third respective start signal STVr-3 is not provided to the third respective scan sub-circuit. The first display sub-area is configured to maintain the image displayed in the first display sub-area in the first frame of image. The third display sub-area is configured to maintain the image displayed in the third display sub-area in the first frame of image.

As shown in FIG. 17, in the second frame of image 2F, the second respective start signal STVr-2 is provided to the second respective scan sub-circuit at a frequency that is three times of a frequency by which the second respective start signal STVr-2 is provided to the second respective scan sub-circuit in the first frame of image 1F. Accordingly, the second display sub-area achieves a higher frame rate as compared to the first display sub-area and the third display sub-area.

FIG. 17 depicts an operation of the respective scan circuit in a second mode. In the second mode, at least two respective scan sub-circuits of the plurality of respective scan sub-circuits are configured to receive start signals from two start signal lines of the plurality of start signal lines with two different frequencies, respectively. Optionally, at least two respective scan sub-circuits of the plurality of respective scan sub-circuits are configured to receive start signals from two start signal lines of the plurality of start signal lines with two different frequencies in at least one frame of image, respectively. Optionally, the at least two respective scan sub-circuits are two adjacent respective scan sub-circuits In one example, in the second mode, the display panel driven by the driving circuit according to the present disclosure has a frame rate in a range of 180 Hz to 270 Hz in the second display sub-area, and has a frame rate in a range of 1 Hz to 10 Hz in the first display sub-area and the third display sub-area.

Figure 18:
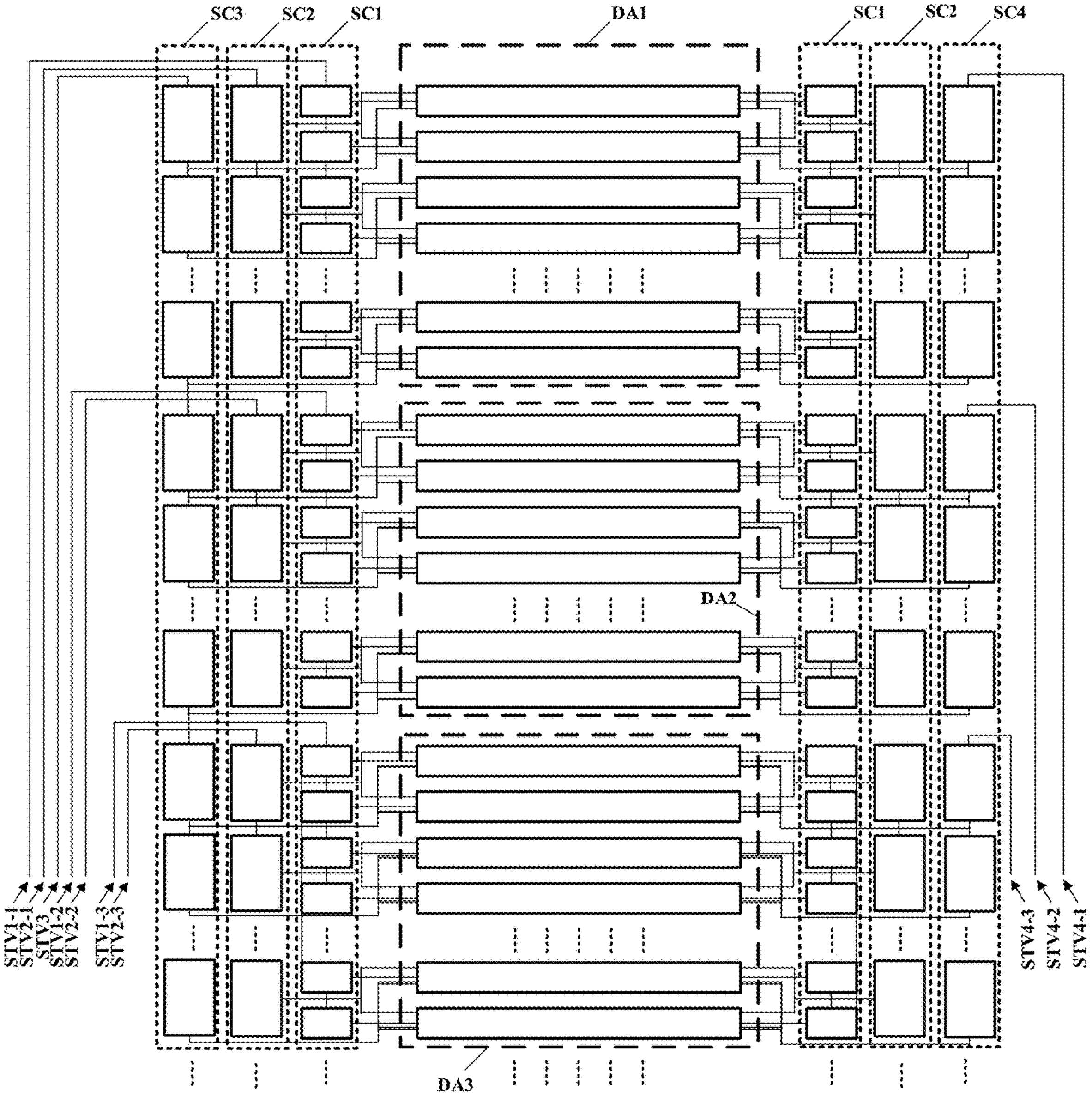
FIG. 18 is a schematic diagram illustrating one or more scan circuits in some embodiments according to the present disclosure.

FIG. 13 illustrates a specific example in which each of the one or more scan circuits includes a plurality of scan subcircuits. Various appropriate alternative implementations may be practiced in the present disclosure. For example, at least one of the one or more scan circuits may not include multiple scan subcircuits, and at least one of the one or more scan circuits includes multiple scan subcircuits. FIG. 18 is a schematic diagram illustrating one or more scan circuits in some embodiments according to the present disclosure. Referring to FIG. 18, the one or more scan circuit in some embodiments include a first scan circuit SC1, a second scan circuit SC2, a third scan circuit SC3, and a fourth scan circuit SC4. In the particular example depicted in FIG. 18, the first scan circuit SC1, the second scan circuit SC2, and the fourth scan circuit SC4 are the same as those depicted in FIG. 13. In the particular example depicted in FIG. 18, the third scan circuit SC3 differs from that depicted in FIG. 13 in that, in the example depicted in FIG. 18, the third scan circuit SC3 is configured to receive a third start signal from a third start signal line STV3, which is configured to provide the third start signal to all scan units of the third scan circuit SC3. In some embodiments, the third scan circuit SC3 is configured to drive the plurality of display sub-areas with a same driving frequency. In some embodiments, the third scan circuit SC3 is configured to provide control signals to the plurality of display sub-areas with a same frequency. The third scan circuit SC3 in some embodiments is a light emitting control signal generating circuit configured to generate light emitting control signals for pixel driving circuits in the display area DA.

Figure 19:
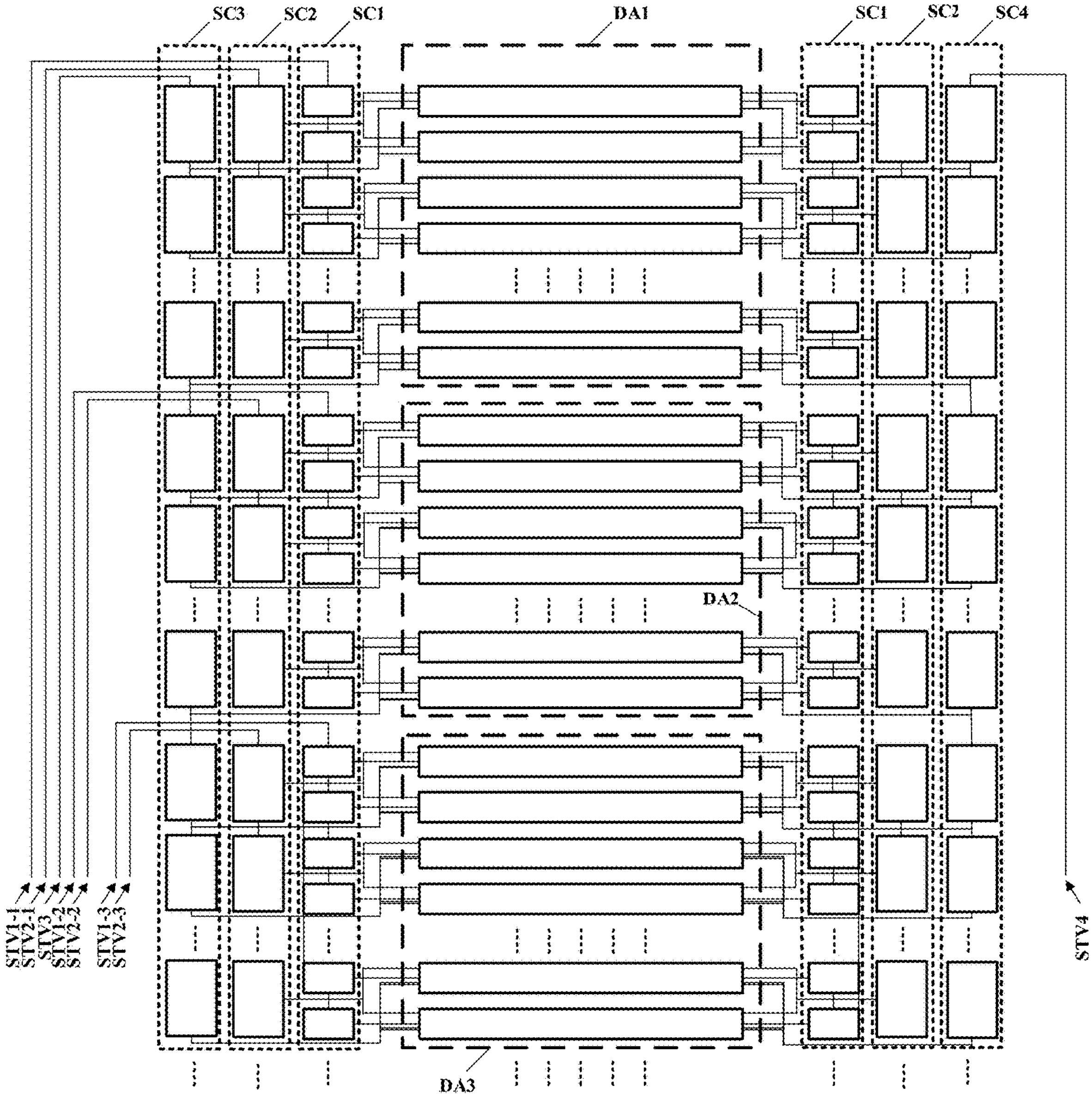
FIG. 19 is a schematic diagram illustrating one or more scan circuits in some embodiments according to the present disclosure.

FIG. 19 is a schematic diagram illustrating one or more scan circuits in some embodiments according to the present disclosure. Referring to FIG. 19, the one or more scan circuit in some embodiments include a first scan circuit SC1, a second scan circuit SC2, a third scan circuit SC3, and a fourth scan circuit SC4. In the particular example depicted in FIG. 19, the first scan circuit SC1 and the second scan circuit SC2 are the same as those depicted in FIG. 13. In the particular example depicted in FIG. 19, the third scan circuit SC3 and the fourth scan circuit SC4 are different from those depicted in FIG. 13. In the particular example depicted in FIG. 19, the third scan circuit SC3 differs from that depicted in FIG. 13 in that, in the example depicted in FIG. 19, the third scan circuit SC3 is configured to receive a third start signal from a third start signal line STV3, which is configured to provide the third start signal to all scan units of the third scan circuit SC3. In the particular example depicted in FIG. 19, the fourth scan circuit SC4 differs from that depicted in FIG. 13 in that, in the example depicted in FIG. 19, the fourth scan circuit SC4 is configured to receive a fourth start signal from a fourth start signal line STV4, which is configured to provide the fourth start signal to all scan units of the fourth scan circuit SC4. In some embodiments, the third scan circuit SC3 is configured to provide control signals to the plurality of display sub-areas with a same frequency. The third scan circuit SC3 in some embodiments is a light emitting control signal generating circuit configured to generate light emitting control signals for pixel driving circuits in the display area DA. In some embodiments, the fourth scan circuit SC4 is configured to provide control signals to the plurality of display sub-areas with a same frequency. The fourth scan circuit SC4 in some embodiments is a sensing control signal generating circuit configured to generate sensing control signals for pixel driving circuits in the display area DA.

Figure 20:
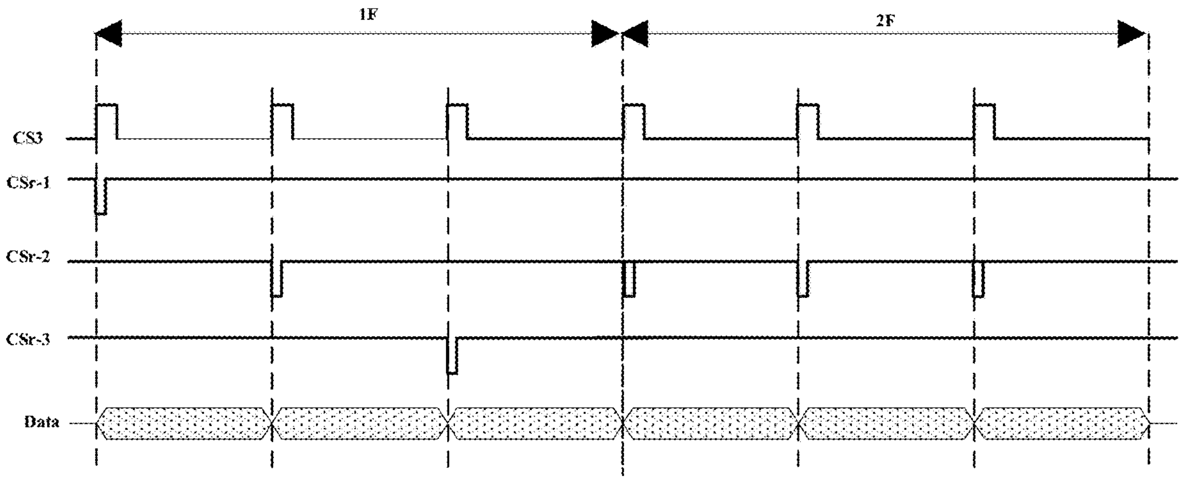
FIG. 20 is a timing diagram illustrating the operation of a driving circuit in some embodiments according to the present disclosure.

FIG. 20 is a timing diagram illustrating the operation of a driving circuit in some embodiments according to the present disclosure. FIG. 20 shows the operation of the driving circuit in two frames of image, e.g., a first frame of image 1F and a second frame of image 2F. FIG. 20 depicts an operation of the respective scan circuit in the second mode. In some embodiments, a respective scan circuit selected from the first scan circuit SC1, the second scan circuit SC2, or the fourth scan circuit SC4 depicted in FIG. 18 includes N number of respective scan sub-circuits configured to receive N number of respective start signals from N number of respective start signal lines, respectively. For example, the N number of respective start signals may include a first respective start signal, a second respective start signal, and a third respective start signal. In some embodiments, the third scan circuit SC3 depicted in FIG. 18 does not include multiple scan sub-circuits. In one example, the third scan circuit SC3 is a light emitting control signal generating circuit.

In the first frame of image, the N number of respective scan sub-circuits are configured to output N number of respective control signals to N number of display sub-areas. The N number of respective control signals may include a first respective control signal CSr-1, a second respective control signal CSr-2 and a third respective control signal CSr-3. In one example, the N number of respective control signals are control signals for controlling data write transistors in the display area. For example, when a first respective control signal CSr-1 is provided to a data write transistor in a first display sub-area, data signals transmit through the data write transistor in the first display sub-area, as shown in FIG. 14. When a second respective control signal CSr-2 is provided to a data write transistor in a second display sub-area, data signals transmit through the data write transistor in the second display sub-area. When a third respective control signal CSr-3 is provided to a data write transistor in a third display sub-area, data signals transmit through the data write transistor in the third display sub-area.

In the second frame of image 2F, the first respective control signal CSr-1 is not output to the first display sub-area, and the third respective control signal CSr-3 is not output to the third display sub-area. The first display sub-area is configured to maintain the image displayed in the first display sub-area in the first frame of image. The third display sub-area is configured to maintain the image displayed in the third display sub-area in the first frame of image. In the second frame of image 2F, the second respective control signal CSr-2 is output at a frequency that is three times of a frequency by which the second respective control signal CSr-2 is output in the first frame of image 1F. Accordingly, the second display sub-area achieves a higher frame rate as compared to the first display sub-area and the third display sub-area.

In the second frame of image 2F, the third scan circuit is configured to receive a third start signal from a third start signal line, which is configured to provide the third start signal to all scan units of the third scan circuit. The third scan circuit is configured to provide control signals CS3 to the plurality of display sub-areas with a same frequency.

The operation method depicted in FIG. 20 achieves a simplified pixel driving scheme. The structure of the driving circuit can also be simplified. The data signals can be written during a period in which the pulse width modulation of the third control signals CS3 is turned off.

Figure 21:
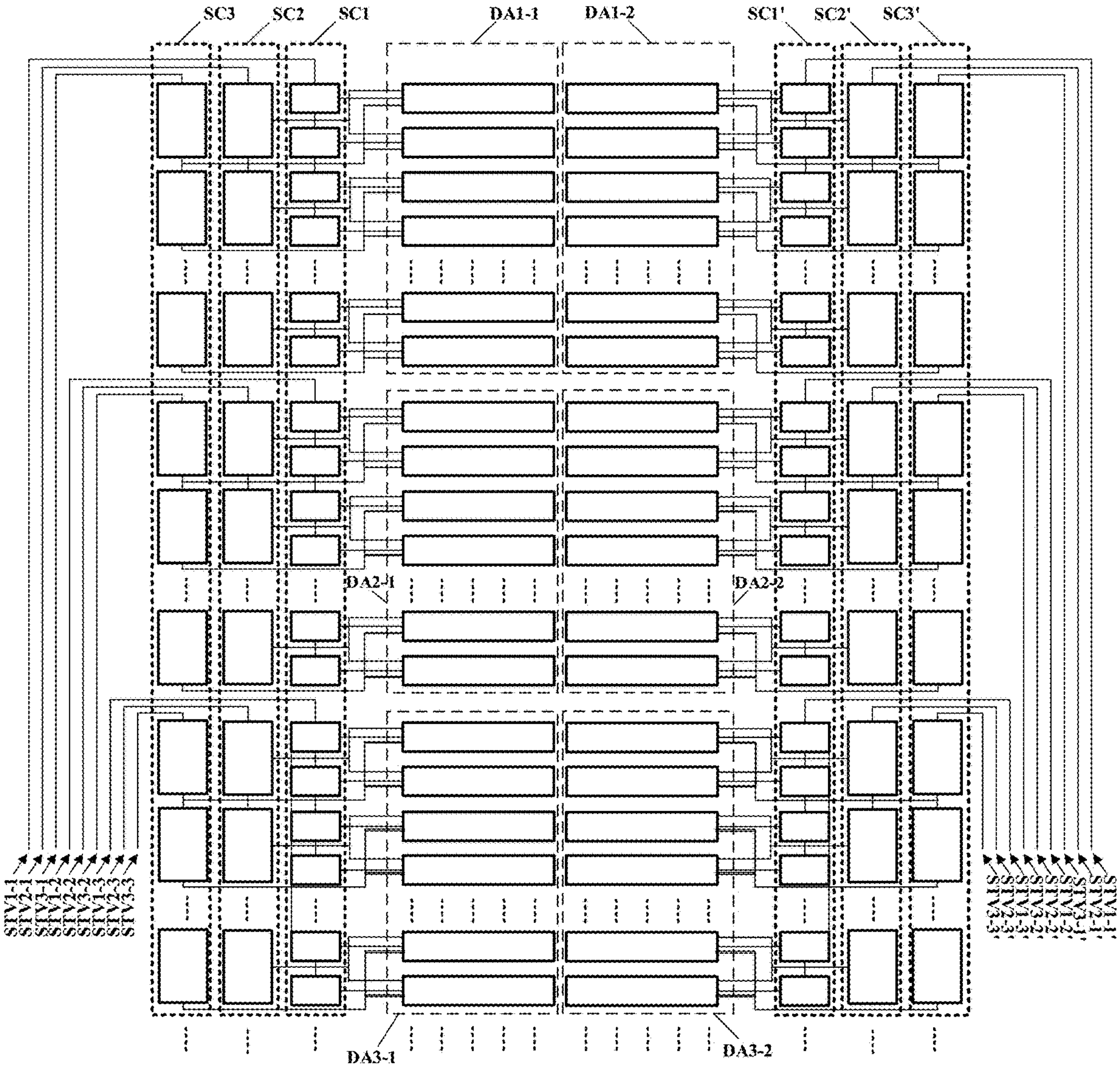
FIG. 21 is a schematic diagram illustrating one or more scan circuits in some embodiments according to the present disclosure.

FIG. 21 is a schematic diagram illustrating one or more scan circuits in some embodiments according to the present disclosure. Referring to FIG. 21, the display area includes a plurality of display sub-areas. In some embodiments, the plurality of display sub-areas include a first display sub-area comprising a plurality of rows of subpixels. The first display sub-area includes a first display sub-area first part DA1-1 and a first display sub-area second part DA1-2. A respective row of subpixels in the first display sub-area first part DA1-1 and a respective row of subpixels in the first display sub-area second part DA1-2 are in a same row. The driving circuit includes a first scan circuit SC1 configured to provide control signals to the first display sub-area first part DA1-1, and an auxiliary first scan circuit SC1' configured to provide control signals to the first display sub-area second part DA1-2. Optionally, the first scan circuit SC1 and the auxiliary first scan circuit SC1' are configured to independently provide control signals to the first display sub-area first part DA1-1 and the first display sub-area second part DA1-2.

In some embodiments, the plurality of display sub-areas further include a second display sub-area comprising a plurality of rows of subpixels. The second display sub-area includes a second display sub-area first part DA2-1 and a second display sub-area second part DA2-2. A respective row of subpixels in the second display sub-area first part DA2-1 and a respective row of subpixels in the second display sub-area second part DA2-2 are in a same row. The driving circuit includes a second scan circuit SC2 configured to provide control signals to the second display sub-area first part DA2-1, and an auxiliary second scan circuit SC2' configured to provide control signals to the second display sub-area second part DA2-2. Optionally, the second scan circuit SC2 and the auxiliary second scan circuit SC2' are configured to independently provide control signals to the second display sub-area first part DA2-1 and the second display sub-area second part DA2-2.

In some embodiments, the plurality of display sub-areas further include a third display sub-area comprising a plurality of rows of subpixels. The third display sub-area includes a third display sub-area first part DA3-1 and a third display sub-area second part DA3-2. A respective row of subpixels in the third display sub-area first part DA3-1 and a respective row of subpixels in the third display sub-area second part DA3-2 are in a same row. The driving circuit includes a third scan circuit SC3 configured to provide control signals to the third display sub-area first part DA3-1, and an auxiliary second scan circuit SC3' configured to provide control signals to the third display sub-area second part DA3-2. Optionally, the third scan circuit SC3 and the auxiliary third scan circuit SC3' are configured to independently provide control signals to the third display sub-area first part DA3-1 and the third display sub-area second part DA3-2.

The driving circuit may include additional scan circuits such as a fourth scan circuit and an auxiliary fourth scan circuit. The display area may include additional display sub-areas such as a fourth display sub-area first part and a fourth display sub-area second part.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T1C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 22:
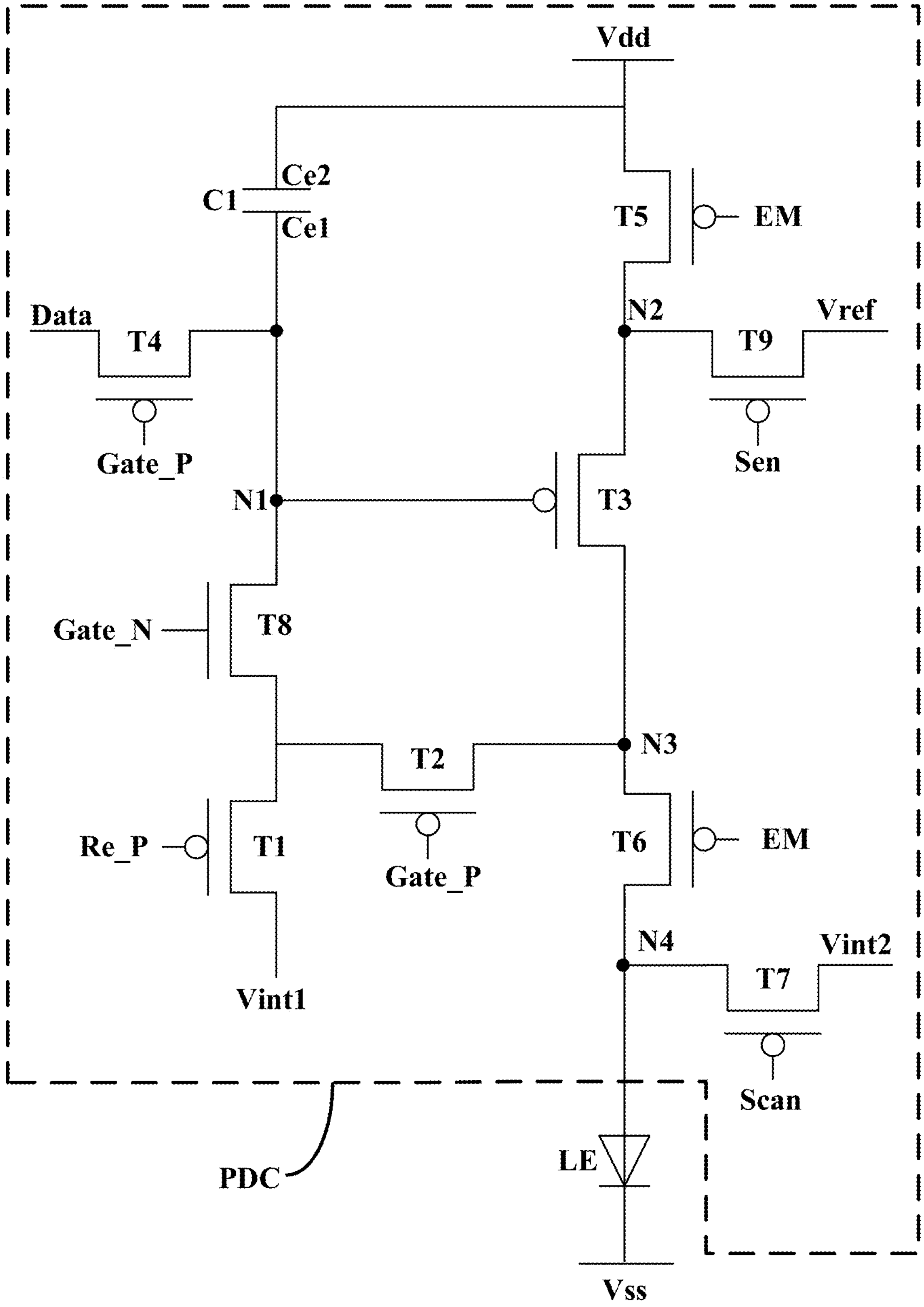
FIG. 22 is a circuit diagram illustrating the structure of a pixel driving circuit in some embodiments according to the present disclosure.

FIG. 22 is a circuit diagram illustrating the structure of a pixel driving circuit in some embodiments according to the present disclosure. Referring to FIG. 22, the pixel driving circuit includes a driving transistor T3, a storage capacitor C1 having a first capacitor electrode Ce1 and a second capacitor electrode Ce2; a data write transistor T4 having a gate electrode connected to a first gate line Gate_P, a first electrode connected to a data line Data, and a second electrode connected to the first capacitor electrode Ce1. A gate electrode of the driving transistor T3 is connected to the first capacitor electrode Ce1 and the second electrode of the data write transistor T4.

In some embodiments, the pixel driving circuit further includes a control transistor T8 having a gate electrode connected to a second gate line Gate_N, a first electrode connected to a second electrode of a first reset transistor T1, and a second electrode connected to the first capacitor electrode Ce1 and the second electrode of the data write transistor T4.

In some embodiments, the pixel driving circuit further includes a compensating transistor T2 having a gate electrode connected to the first gate line Gate_P; a first electrode connected to the second electrode of the first reset transistor T1 and the first electrode of the control transistor T8; and a second electrode connected to a second electrode of the driving transistor T3.

In some embodiments, the first capacitor electrode Ce1 of the storage capacitor C1 is connected to the second electrode of the control transistor T8, the second electrode of the data write transistor T4, and the gate electrode of the driving transistor T3. The second capacitor electrode Ce2 of the storage capacitor C1 is connected to a first voltage supply line Vdd (e.g., a high voltage signal line).

In some embodiments, the pixel driving circuit further includes a first light emitting control transistor T5 having a gate electrode connected to a light emitting control signal line EM, a first electrode connected to the first voltage supply line Vdd, and a second electrode connected to the first electrode of the driving transistor T3.

In some embodiments, the pixel driving circuit further includes a second light emitting control transistor T6 having a gate electrode connected to the light emitting control signal line EM, a first electrode connected to the second electrode of the driving transistor T3 and the second electrode of the compensating transistor T2, and a second electrode connected to an anode of a light emitting element LE.

In some embodiments, the pixel driving circuit further includes at least one reset transistor. In some embodiments, the pixel driving circuit further includes a first reset transistor T1 having a gate electrode connected to a reset control signal line Re_P, a first electrode connected to a first reset signal line Vint1, and a second electrode connected to the first electrode of the control transistor T8 and the first electrode of the compensating transistor T2.

In some embodiments, the pixel driving circuit further includes a second reset transistor T7 having a gate electrode connected to a control signal line Scan, a first electrode connected to a second reset signal line Vint2, and a second electrode connected to the second electrode of the second light emitting control transistor T6 and the anode of the light emitting element LE.

In some embodiments, the pixel driving circuit further includes a sensing transistor T9 having a gate electrode connected to a sensing control signal line Sen; a first electrode connected to a reference signal line Vref; and a second electrode connected to the first electrode of the driving transistor T3 and the second electrode of the first light emitting control transistor T5.

The pixel driving circuit further include a first node N1, a second node N2, a third node N3, and a fourth node N4. The first node N1 is connected to the gate electrode of the driving transistor T3, the first capacitor electrode Ce1, the second electrode of the data write transistor T4, and the second electrode of the control transistor T8. The second node N2 is connected to the first electrode of the driving transistor T3, the second electrode of the first light emitting control transistor T5, and the second electrode of the sensing transistor T9. The third node N3 is connected to the second electrode of the driving transistor T3, the second electrode of the compensating transistor T2, and the first electrode of the second light emitting control transistor T6. The fourth node N4 is connected to the second electrode of the second light emitting control transistor T6, the second electrode of the second reset transistor T7, and the anode of the light emitting element LE.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 22, in one example, the control transistor T8 is a p-type transistor such as a polysilicon transistor. The driving transistor T3, the data write transistor T4, and the first light emitting control transistor T5, the second light emitting control transistor T6, the compensating transistor T2, the first reset transistor T1, and the second reset transistor T7 are n-type transistors such as metal oxide transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 23:
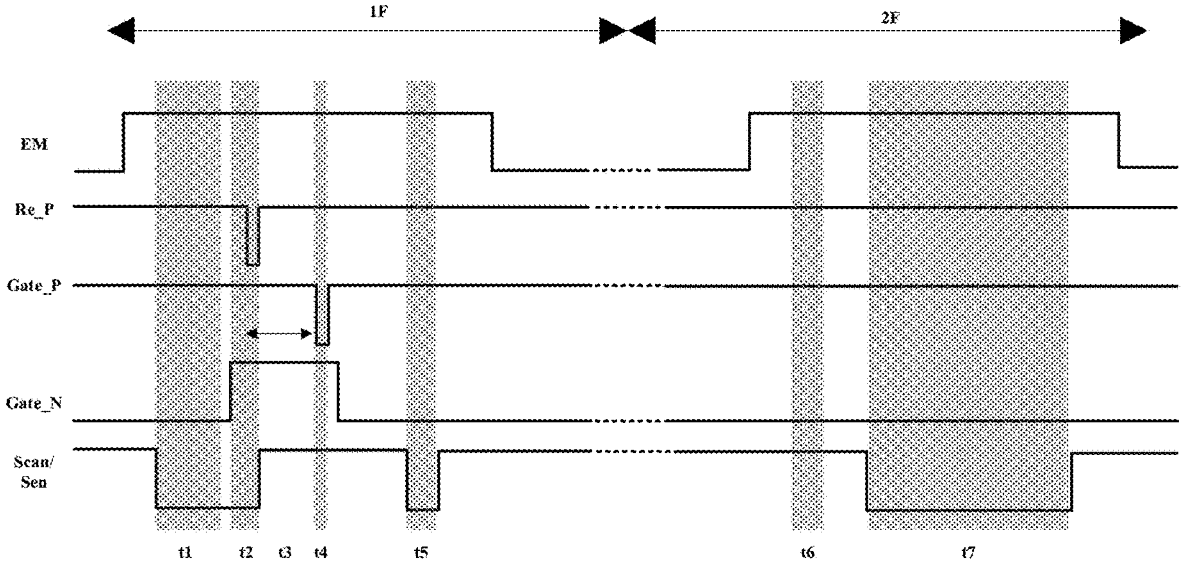
FIG. 23 is a timing diagram illustrating the operation of a pixel driving circuit in some embodiments according to the present disclosure.

FIG. 23 is a timing diagram illustrating the operation of a pixel driving circuit in some embodiments according to the present disclosure. Referring to FIG. 23, during one frame of image, the operation of the pixel driving circuit includes a first phase t1, a second phase t2, a third phase t3, a fourth phase t4, a fifth phase t5, a sixth phase t6, and a seventh phase t7. The first phase t1 is a reset phase in which the anode of the light emitting element is reset. In the second phase t2, the node N1 is reset. The fourth phase t4 is a data write phase in which the data signal is written to the node N1. The sixth phase t6 and the seventh phase t7 are phases of the second frame of image 2F.

Figure 24:
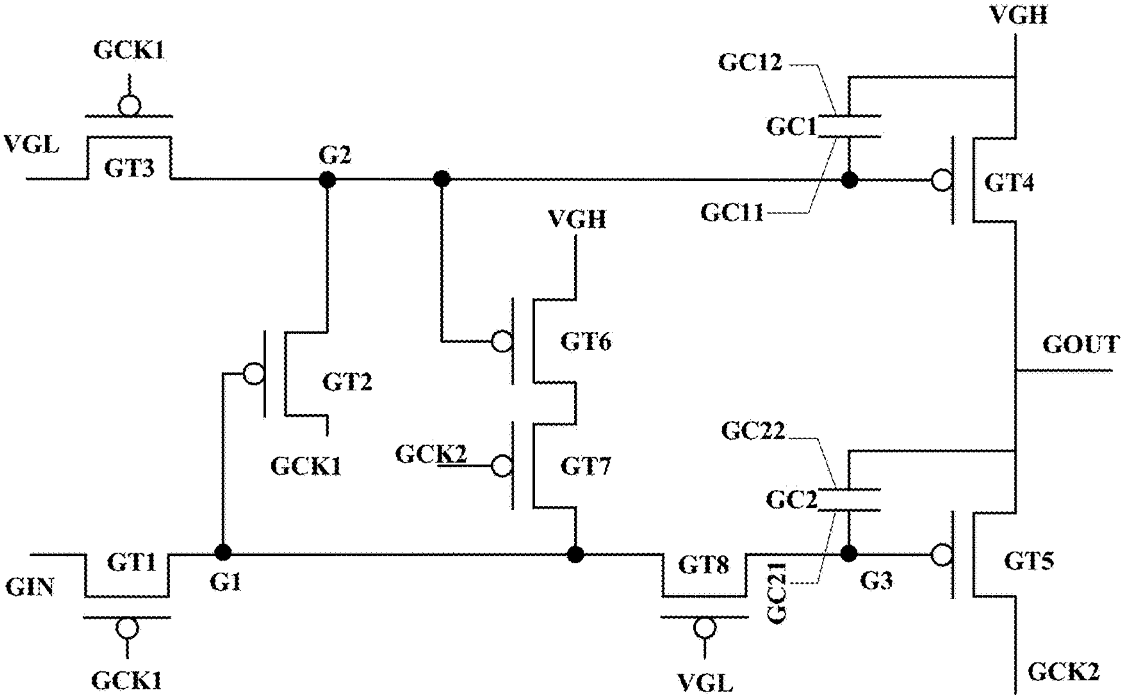
FIG. 24 is a circuit diagram of a respective scan unit of a scan circuit in some embodiments according to the present disclosure.

Various appropriate scan circuits may be used in the present disclosure. FIG. 24 is a circuit diagram of a respective scan unit of a scan circuit in some embodiments according to the present disclosure. Referring to FIG. 24, the respective scan unit includes a first control transistor GT1 to an eighth control transistor GT8, a first control capacitor GC1 and a second control capacitor GC2. In some embodiments, a gate electrode of the first control transistor GT1 is electrically connected to a first clock signal terminal GCK1, a first electrode of the first control transistor GT1 is electrically connected to an input terminal GIN, a second electrode of the first control transistor GT1 is electrically connected to a first node G1; a gate electrode of the second control transistor GT2 is electrically connected to the first node G1, a first electrode of the second control transistor GT2 is electrically connected to the first clock signal terminal GCK1, the second electrode of the second control transistor GT2 is electrically connected to a second node G2; a gate electrode of the third control transistor GT3 is electrically connected to a first clock signal terminal GCK1, a first electrode of the third control transistor GT3 is electrically connected to a second power supply VGL, a second electrode of the third control transistor GT3 is electrically connected to the second node G2; a gate electrode of the fourth control transistor GT4 is electrically connected to the second node G2, a first electrode of the fourth control transistor GT4 is electrically connected to a first power supply VGH, a second electrode of the fourth control transistor GT4 is electrically connected to an output terminal GOUT; a gate electrode of the fifth control transistor GT5 is electrically connected to a third node G3, a first electrode of the fifth control transistor GT5 is electrically connected to a second clock signal terminal GCK2, a second electrode of the fifth control transistor GT5 is electrically connected to the output terminal GOUT; a gate electrode of the sixth control transistor GT6 is electrically connected to the second node G2, a first electrode of the sixth control transistor GT6 is electrically connected to the first power supply VGH, a second electrode of the sixth control transistor GT6 is electrically connected to a first electrode of a seventh control transistor GT7; a gate electrode of the seventh control transistor GT7 is electrically connected to the second clock signal terminal GCK2, a second electrode of the seventh control transistor GT7 is electrically connected to the first node G1; a gate electrode of the eighth control transistor GT8 is electrically connected to a second power supply VGL, a first electrode of the eighth control transistor GT8 is electrically connected to the first node G1, a second electrode of the eighth control transistor GT8 is electrically connected to a third node G3; a first electrode plate GC11 of a first control capacitor GC1 is electrically connected to the second node G2, a second electrode plate GC12 of the first control capacitor GC1 is electrically connected to the first power supply VGH; and a first electrode plate GC21 of a second control capacitor GC2 is electrically connected to the third node G3, and a second electrode plate GC22 of the second control capacitor GC2 is electrically connected to the output terminal GOUT. In one example, the first control transistor GT1 to the eighth control transistor GT8 may be a P-type transistor or may be an N-type transistor. In another example, the first power supply VGH provides a continuous high level signal and the second power supply VGL provides a continuous low level signal.

In one example, the respective scan unit depicted in FIG. 24 may be a respective scan unit in the first scan circuit (e.g., a first gate scanning signal generating circuit).

Figure 25:
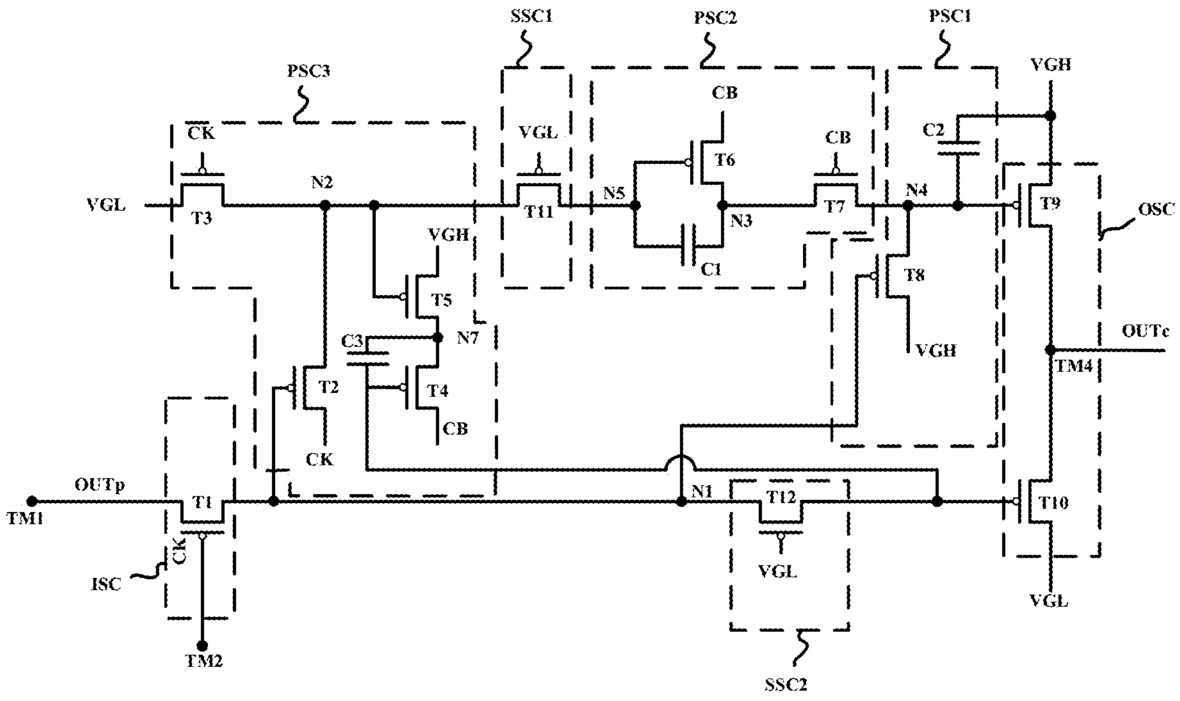
FIG. 25 is a circuit diagram of a scan unit in a scan circuit in some embodiments according to the present disclosure.

FIG. 25 is a circuit diagram of a scan unit in a scan circuit in some embodiments according to the present disclosure. Referring to FIG. 25, the respective scan unit in some embodiments includes an input subcircuit ISC, an output subcircuit OSC, a first processing subcircuit PSC1, a second processing subcircuit PSC2, a third processing subcircuit PSC3, a first stabilizing subcircuit SSC1, and a second stabilizing subcircuit SSC2. A respective scan unit may be configured to transmit control signals to one or more rows of subpixels. In one example, the respective scan unit is configured to transmit control signals to a single row of subpixels. In another example, the respective scan unit is configured to transmit control signals to two or more rows of subpixels.

In some embodiments, the output subcircuit OSC is configured to supply the voltage of a first power supply VGH or a second power supply VGL to an output terminal TM4 in response to voltages of a fourth node N4 and a first node N1. Optionally, the output subcircuit OSC includes a ninth transistor T9 and a tenth transistor T10.

The ninth transistor T9 is coupled between a first power supply VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the first power supply VGH is provided to the output terminal TM4, which (annotated as Outc in FIG. 25) may be transmitted to an n-th gate line and used as a gate driving signal having a gate-on level.

The tenth transistor T10 is coupled between the output terminal TM4 and a second power supply VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the second power supply VGL is provided to the output terminal TM4, which (annotated as Outc in FIG. 25) may be provided to an n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltages of the first node N1. Optionally, the first processing subcircuit PSC1 includes an eighth transistor T8 and a second capacitor C2.

The eighth transistor T8 is coupled between the first power supply VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the first power supply VGH may be provided to the fourth node N4.

The second capacitor C2 is coupled between the first power supply VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the first power supply VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

The fifth transistor T5 is coupled between the first power supply VGH and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the third input terminal TM3. A first electrode of the fourth transistor T4 is configured to be provided with the second clock signal CB provided to the third input terminal TM3. A gate electrode of the fourth transistor T4 is coupled to the gate electrode of the tenth transistor T10. A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the second power supply VGL. A gate electrode of the third transistor T3 is coupled to the second input terminal TM2. When the first clock signal CK is provided to the second input terminal TM2, the third transistor T3 may be turned on so that the voltage of the second power supply VGL may be provided to the second node N2.

The third capacitor C3 is coupled between the tenth transistor T10 and the fifth transistor T5. A first capacitor electrode of the third capacitor C3 is coupled to the second electrode of the fifth transistor T5 and the first electrode of the fourth transistor T4. A second capacitor electrode of the third capacitor C3 is coupled to the gate electrode of the fourth transistor T4 and the gate electrode of the tenth transistor T10.

In some embodiments, the first stabilizing subcircuit SSC1 is coupled between the second processing subcircuit PSC2 and the third processing subcircuit PSC3. Optionally, the first stabilizing subcircuit SSC1 is configured to limit a voltage drop width of the second node N2. Optionally, the first stabilizing subcircuit SSC1 includes an eleventh transistor T11.

The eleventh transistor T11 is coupled between the second node N2 and the fifth node N5. A gate electrode of the eleventh transistor T11 is coupled to the second power supply VGL. Since the second power supply VGL has a gate-on level voltage, the eleventh transistor T11 may always remain turned on. Therefore, the second node N2 and the fifth node N5 may be maintained at the same voltage, and operated as substantially the same node.

In some embodiments, the second stabilizing subcircuit SSC2 is coupled between the first node N1 and the output subcircuit OSC. Optionally, the second stabilizing subcircuit SSC2 is configured to limit a voltage drop width of the first node N1. Optionally, the second stabilizing subcircuit SSC2 includes a twelfth transistor T12.

The twelfth transistor T12 is coupled between the first node N1 and a gate electrode of the tenth transistor T10. A gate electrode of the twelfth transistor T12 is coupled to the second power supply VGL. Since the second power supply VGL has a gate-on level voltage, the twelfth transistor T12 may always remain turned on. Therefore, the first node N1 and the gate electrode of the tenth transistor T10 may be maintained at the same voltage.

In some embodiments, referring to FIG. 25, each of the first to twelfth transistors T1 to T12 may be formed of a p-type transistor. In some embodiments, the gate-on voltage of the first to twelfth transistors T1 to T12 may be set to a low level, and the gate-off voltage thereof may be set to a high level.

In alternative embodiments, each of the first to twelfth transistors T1 to T12 may be formed of an n-type transistor. In some embodiments, the gate-on voltage of the first to twelfth transistors T1 to T12 may be set to a high level, and the gate-off voltage thereof may be set to a low level.

In one example, the respective scan unit depicted in FIG. 24 may be a respective scan unit in the second scan circuit, the third scan circuit, or the fourth scan circuit described in the present disclosure.

Figure 26:
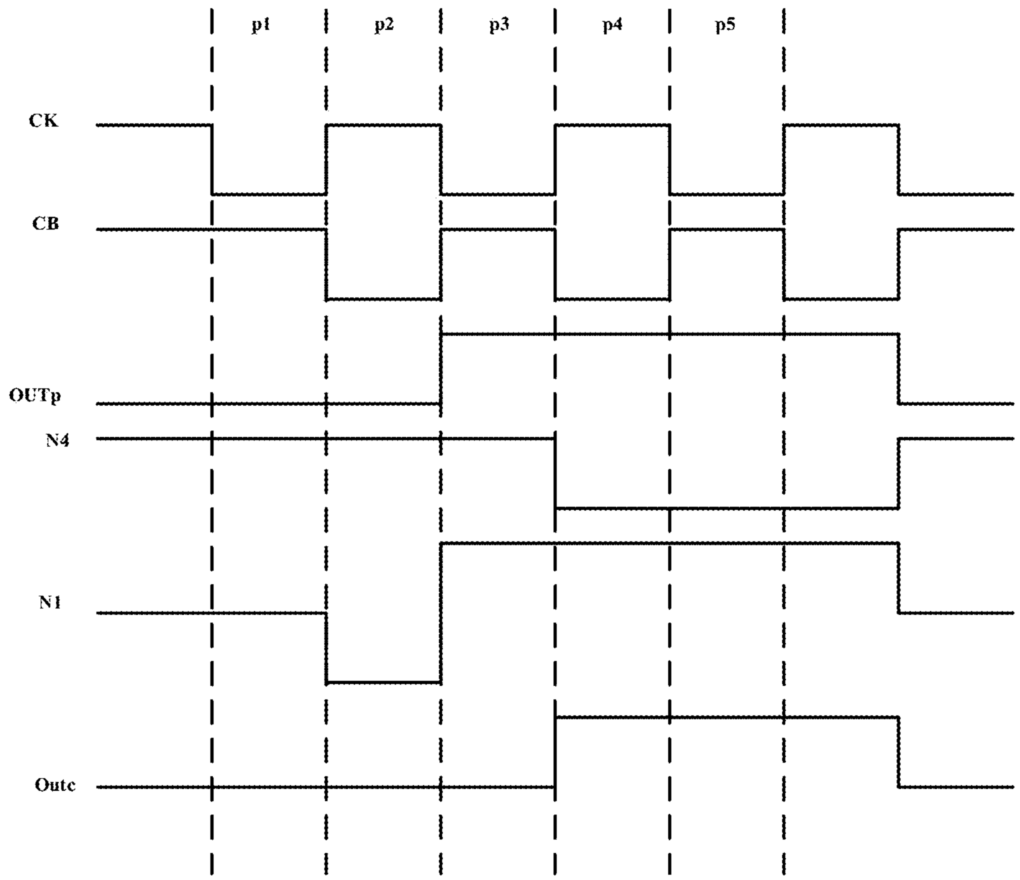
FIG. 26 is a timing diagram illustrating an operation of a stage of a scan unit in some embodiments according to the present disclosure.

FIG. 26 is a timing diagram illustrating an operation of a stage of a scan unit in some embodiments according to the present disclosure. Referring to FIG. 26, the operation of the stage of a scan unit in some embodiments includes a first period p1, a second period p2, a third period p3, a fourth period p4, and a fifth period p5.

In some embodiments, during a first period p1, the first clock signal CK is provided to the second input terminal TM2. The first transistor T1 and the third transistor T3 are turned on. Furthermore, during the first period p1, the second clock signal CB is not provided to the third input terminal TM3, the seventh transistor T7 is turned off.

In some embodiments, when the first transistor T1 is turned on, the first input terminal TM1 and the first node N1 are electrically coupled to each other. The twelfth transistor T12 remains turned on, the first input terminal TM1 is electrically coupled with the gate electrode of the fourth transistor T4 via the first node N1.

In some embodiments, during the first period p1, the start signal STV or the output signal Outp from the output terminal of the previous scan unit to be provided to the first input terminal TM1 has the low level, a low voltage (e.g., the voltage of the second power supply VGL) may be applied to the first node N1 and the gate electrode of the fourth transistor T4. When the gate electrode of the fourth transistor T4 and the first node N1 are set to the low voltage, the third transistor T3, the fourth transistor T4, the eighth transistor T8, and the tenth transistor T10 are turned on.

In some embodiments, when the fourth transistor T4 is turned on, the third input terminal TM3 and the seventh node N7 are electrically coupled to each other. The second clock signal CB is not provided to the third input terminal TM3 during the first period p1, a high voltage may be provided to the seventh node N7. The third capacitor C3 is configured to charge a voltage corresponding to the turned-on state of the fourth transistor T4.

In some embodiments, when the fourth transistor T4 is turned on, the fifth transistor T5 is connected in the form of a diode between the second node N2 and the first power supply VGH. When the fifth transistor T5 is turned on during the first period p1, the voltage of the first power supply VGH is not transmitted to the second node N2, and the voltage of the second node N2 is maintained at the voltage of the preceding state, e.g., the high voltage. The eleventh transistor T11 remains turned on, the high voltage of the second node N2 is applied to the fifth node N5, and the fifth node N5 is set to the high voltage. The second transistor T2 and the sixth transistor T6 are turned off.

In some embodiments, when the eighth transistor T8 is turned on, the voltage of the first power supply VGH is provided to the fourth node N4. The ninth transistor T9 is turned off.

In some embodiments, when the tenth transistor T10 is turned on, the voltage of the second power supply VGL is provided to the output terminal TM4. During the first period p1, the gate driving signal are not provided to the n-th stage gate line.

In some embodiments, during a second period p2, the supply of the first clock signal CK to the second input terminal TM2 is interrupted. The first transistor T1 and the third transistor T3 are turned off. The fourth node N4 and the first node N1 maintain the voltages of the preceding period by the second capacitor C2 and the third capacitor C3. Since the fourth node N4 remains in the high voltage state, the ninth transistor T9 remains turned off. Since the first node N1 remains in the low voltage state, the second transistor T2, the fourth transistor T4, the eighth transistor T8, and the tenth transistor T10 remain turned on.

In some embodiments, during the second period p2, the second clock signal CB is provided to the third input terminal TM3. The seventh transistor T7 is turned on by the second clock signal CB provided to the third input terminal TM3. When the seventh transistor T7 is turned on, the fourth node N4 and the third node N3 are electrically coupled to each other. The third node N3 is set to the high voltage.

In some embodiments, during the second period p2, the second clock signal CB is provided to the seventh node N7 via the fourth transistor T4 that is turned on. A low voltage is provided to the seventh node N7. The voltage of the first node N1 is maintained at a voltage (a 2-step low voltage) less than the voltage of the second power supply VGL by coupling of the third capacitor C3.

In some embodiments, during a third period p3, the supply of the second clock signal CB to the third input terminal TM3 is interrupted. When the supply of the second clock signal CB is interrupted, the seventh transistor T7 is turned off.

In some embodiments, during the third period p3, the start signal STV or the output signal Outp from the output terminal of the previous scan unit is provided to the first input terminal TM1, and the first clock signal CK is provided to the second input terminal TM2. When the first clock signal CK is provided to the second input terminal TM2, the first transistor T1 and the third transistor T3 are turned on.

In some embodiments, when the first transistor T1 is turned on, the first input terminal TM1 and the first node N1 are electrically coupled to each other. The twelfth transistor T12 remains turned on, the first input terminal TM1 is electrically coupled with the gate electrode of the fourth transistor T4 via the first node N1. The gate electrode of the fourth transistor T4 and the first node N1 are set to the high voltage by the start signal STV or the output signal Outp from the output terminal of the previous scan unit that is provided to the first input terminal TM1. When the gate electrode of the fourth transistor T4 and the first node N1 are set to the high voltage, the second transistor T2, the fourth transistor T4, the eighth transistor T8, and the tenth transistor T10 are turned off.

In some embodiments, when the third transistor T3 is turned on, the low voltage of the second power supply VGL is applied to the second node N2 so that the second node N2 and the fifth node N5 are set to the low voltage. The second transistor T2 and the sixth transistor T6 may be turned on.

In some embodiments, when the fifth transistor T5 is turned on, the voltage of the first power supply VGH is applied to the seventh node N7. The seventh node N7 is maintained at the high voltage. Since the fourth transistor T4 remains turned off, the voltage of the second clock signal CB to be applied to the third input terminal TM3 is not transmitted to the seventh node N7. Since both the seventh node N7 and the first node N1 that are the opposite ends of the third capacitor C3 are maintained at the high voltage, the third capacitor C3 is not charged or discharged. A current path is formed from the first power supply VGH to the first node N1 via the fifth transistor T5, and the high voltage of the first power supply VGH is transmitted to the first node N1. The voltage of the first node N1 is stably maintained at the high level.

In some embodiments, when the sixth transistor T6 is turned on, the third input terminal TM3 and the third node N3 are electrically coupled to each other. Since the second clock signal CB is not provided to the third input terminal TM3 during the third period p3, the third node N3 is maintained at the high voltage. Since the seventh transistor T7 remains turned off, the voltage of the third node N3 does not affect the voltage of the fourth node N4. The first capacitor C1 is configured to store a voltage corresponding to the turn-on level of the sixth transistor T6.

In some embodiments, during a fourth period p4, the second clock signal CB may be provided to the third input terminal TM3. When the second clock signal CB is provided to the third input terminal TM3, the seventh transistor T7 is turned on.

In some embodiments, when the seventh transistor T7 is turned on, the fourth node N4 and the third node N3 are electrically coupled to each other. The low voltage of the second clock signal CB that is provided to the third input terminal TM3 via the sixth transistor T6 that remains turned on is provided to the third node N3 and the fourth node N4. When the low voltage is provided to the fourth node N4, the ninth transistor T9 is turned on.

In some embodiments, when the ninth transistor T9 is turned on, the voltage of the first power supply VGH is provided to the output terminal TM4. The voltage of the first power supply VGH that is provided to the output terminal TM4 is provided to the n-th stage gate line as the gate driving signal.

In some embodiments, during a fifth period p5, the supply of the second clock signal CB to the third input terminal TM3 is interrupted. When the supply of the second clock signal CB is interrupted, the seventh transistor T7 is turned off. The fourth node N4 is stably maintained at the high voltage by the second capacitor C2. The ninth transistor T9 remains turned on, and the voltage of the first power supply VGH is provided to the n-th stage gate line as the gate driving signal.

Although the supply of the second clock signal CB is interrupted during the fifth period p5, the fourth transistor T4 remains turned off and, therefore, the voltage of the second clock signal CB is not provided to the seventh node N7 and does not affect the voltage of the first node N1.

In another aspect, the present disclosure provides a display apparatus comprising a display panel, the driving circuit described herein, and a plurality of start signal lines. The display panel in a display area include a plurality of pixel driving circuits configured to receive control signals from the one or more scan circuits. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In some embodiments, at least two start signal lines of the plurality of start signal lines are configured to provide start signals to the at least two first scan sub-circuits of the plurality of first scan sub-circuits with two different frequencies in at least one frame of image, respectively.

In some embodiments, in a first mode, the plurality of start signal lines are configured to provide start signals to the plurality of first scan sub-circuits with a same frequency.

In some embodiments, in a second mode, the plurality of start signal lines are configured to provide start signals to the plurality of first scan sub-circuits with a same frequency in a first frame of image; and at least two start signal lines of the plurality of start signal lines are configured to provide start signals to the at least two respective scan sub-circuits of the plurality of respective scan sub-circuits with two different frequencies in a second frame of image, respectively.

In some embodiments, in the second mode, at least one of the plurality of start signal lines is configured to provide start signals in the second frame of image to at least one of the plurality of first scan sub-circuits at a frequency lower than a frequency of providing start signals in the first frame of image by the at least one of the plurality of start signal lines to the at least one of the plurality of first scan sub-circuits; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

In some embodiments, in the second mode, at least one of the plurality of start signal lines is not configured to provide start signals in the second frame of image; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

In some embodiments, the one or more scan circuits further comprises a third scan circuit; the plurality of start signal lines comprise a third signal line configured to provide a third start signal to the third scan circuit; and the third scan circuit is configured to provide control signals to the plurality of display sub-areas with a same frequency in the first frame of image and the second frame of image.

In some embodiments, the one or more scan circuits further comprises an auxiliary first scan circuit; the plurality of display sub-area comprise a first display sub-area; the first display sub-area comprises a first display sub-area first part and a first display sub-area second part; a respective row of subpixels in the first display sub-area first part and a respective row of subpixels in the first display sub-area second part are in a same row; and the first scan circuit and the auxiliary first scan circuit are configured to independently provide control signals to the first display sub-area first part and the first display sub-area second part.

In another aspect, the present disclosure provides a method of operating one or more scan circuits. In some embodiments, the method includes providing one or more scan circuits, wherein the one or more scan circuits comprise a first scan circuit, wherein the first scan circuit comprises a plurality of first scan sub-circuits; and driving, by at least two first scan sub-circuits of the plurality of first scan sub-circuits, two display sub-areas of a plurality of display sub-areas of a display area with two different driving frequencies in at least one frame of image, respectively.

In some embodiments, the method further includes receiving, by the at least two first scan sub-circuits of the plurality of first scan sub-circuits, start signals from two start signal lines of a plurality of start signal lines with two different frequencies in at least one frame of image, respectively.

In some embodiments, the method further includes providing, by the at least two first scan sub-circuits of the plurality of first scan sub-circuits, control signals to the two display sub-areas of the plurality of display sub-areas with two different frequencies in at least one frame of image, respectively In some embodiments, the method further includes driving, by the at least two first scan sub-circuits of the plurality of first scan sub-circuits, two display sub-areas of a plurality of display sub-areas of a display area with a same driving frequency in at least another frame of image, respectively.

In some embodiments, the one or more scan circuits further comprises a second scan circuit; and the plurality of start signal lines comprise a second start signal line. Optionally, the method further includes providing, by the second start signal line, a second start signal to all scan units of the second scan circuit; and receiving, by the second scan circuit, the second start signal from the second start signal line.

In some embodiments, the method further includes, in a first mode, providing, by the plurality of first scan sub-circuits, control signals to the plurality of display sub-areas with a same frequency.

In some embodiments, the method further includes, in a second mode, providing, by the plurality of first scan sub-circuits, control signals to the plurality of display sub-areas with a same frequency in a first frame of image; and providing, by the at least two first scan sub-circuits of the plurality of first scan sub-circuits, control signals to two display sub-areas of the plurality of display sub-areas with two different frequencies in a second frame of image, respectively.

In some embodiments, the method further includes, in the second mode, in the second frame of image, outputting, by at least one of the plurality of first scan sub-circuits, control signals at a frequency lower than a frequency of outputting control signals in the first frame of image by the at least one of the plurality of first scan sub-circuits; and in the second frame of image, outputting, by at least another one of the plurality of first scan sub-circuits, control signals at a frequency higher than a frequency of outputting control signals in the first frame of image by the at least another one of the plurality of first scan sub-circuits.

In some embodiments, the method further includes, in the second mode, in the second frame of image, stopping outputting control signals, by at least one of the plurality of first scan sub-circuits; and in the second frame of image, outputting, by at least another one of the plurality of first scan sub-circuits, control signals at a frequency higher than a frequency of outputting control signals in the first frame of image by the at least another one of the plurality of first scan sub-circuits.

In some embodiments, the one or more scan circuits further comprises a third scan circuit. Optionally, the method further includes providing, by the third scan circuit, control signals to the plurality of display sub-areas with a same frequency in the first frame of image and the second frame of image.

In some embodiments, the one or more scan circuits further comprises an auxiliary first scan circuit. Optionally, the method further includes independently providing, by the first scan circuit and the auxiliary first scan circuit, control signals to a first display sub-area first part and a first display sub-area second part of a first display sub-area. Optionally, a respective row of subpixels in the first display sub-area first part and a respective row of subpixels in the first display sub-area second part are in a same row.

In some embodiments, the method further includes providing, by at least two start signal lines of a plurality of start signal lines, start signals to the at least two first scan sub-circuits of the plurality of first scan sub-circuits with two different frequencies in at least one frame of image, respectively.

In some embodiments, the method further includes, in a first mode, providing, by the plurality of start signal lines, start signals to the plurality of first scan sub-circuits with a same frequency.

In some embodiments, the method further includes, in a second mode, providing, by the plurality of start signal lines, start signals to the plurality of first scan sub-circuits with a same frequency in a first frame of image; and providing, by at least two start signal lines of the plurality of start signal lines, start signals to the at least two respective scan sub-circuits of the plurality of respective scan sub-circuits with two different frequencies in a second frame of image, respectively.

In some embodiments, the method further includes, in the second mode, providing, by at least one of the plurality of start signal lines, start signals in the second frame of image to at least one of the plurality of first scan sub-circuits at a frequency lower than a frequency of providing start signals in the first frame of image by the at least one of the plurality of start signal lines to the at least one of the plurality of first scan sub-circuits; and providing, by at least another one of the plurality of start signal lines, start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

In some embodiments, the method further includes, in the second mode, stopping providing, by at least one of the plurality of start signal lines, start signals in the second frame of image; and providing, by at least another one of the plurality of start signal lines, start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

In some embodiments, the one or more scan circuits further comprises a third scan circuit; the plurality of start signal lines comprise a third signal line. Optionally, the method further includes providing, by the third signal line, a third start signal to the third scan circuit; and providing, by the third scan circuit, control signals to the plurality of display sub-areas with a same frequency in the first frame of image and the second frame of image.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A driving circuit, comprising one or more scan circuits;

wherein the one or more scan circuits comprise a first scan circuit;

wherein the first scan circuit comprises a plurality of first scan sub-circuits; and at least two first scan sub-circuits of the plurality of first scan sub-circuits are configured to drive two display sub-areas of a plurality of display sub-areas of a display area with two different driving frequencies in at least one frame of image, respectively;

wherein the one or more scan circuits further comprises a second scan circuit configured to receive a second start signal from a second start signal line, the second start signal line being configured to provide the second start signal to all scan units of the second scan circuit; and the second scan circuit is configured to provide control signals to the plurality of display sub-areas with a same frequency.

2. The driving circuit of claim 1, wherein the at least two first scan sub-circuits of the plurality of first scan sub-circuits are configured to receive start signals from two start signal lines of a plurality of start signal lines with two different frequencies in at least one frame of image, respectively.

3. The driving circuit of claim 1, wherein the at least two first scan sub-circuits of the plurality of first scan sub-circuits are configured to provide control signals to the two display sub-areas of the plurality of display sub-areas with two different frequencies in at least one frame of image, respectively.

4. The driving circuit of claim 1, wherein the at least two first scan sub-circuits of the plurality of first scan sub-circuits are configured to drive two display sub-areas of a plurality of display sub-areas of a display area with a same driving frequency in at least another frame of image, respectively.

5. The driving circuit of claim 1, wherein, in a first mode, the plurality of first scan sub-circuits are configured to provide control signals to the plurality of display sub-areas with a same frequency.

6. A driving circuit, comprising one or more scan circuits;

wherein the one or more scan circuits comprise a first scan circuit;

wherein the first scan circuit comprises a plurality of first scan sub-circuits; and at least two first scan sub-circuits of the plurality of first scan sub-circuits are configured to drive two display sub-areas of a plurality of display sub-areas of a display area with two different driving frequencies in at least one frame of image, respectively;

wherein, in a second mode, the plurality of first scan sub-circuits are configured to provide control signals to the plurality of display sub-areas with a same frequency in a first frame of image; and in the second mode, the at least two first scan sub-circuits of the plurality of first scan sub-circuits are configured to provide control signals to two display sub-areas of the plurality of display sub-areas with two different frequencies in a second frame of image, respectively.

7. The driving circuit of claim 6, wherein, in the second mode, at least one of the plurality of first scan sub-circuits is configured to output control signals in the second frame of image at a frequency lower than a frequency of outputting control signals in the first frame of image by the at least one of the plurality of first scan sub-circuits; and at least another one of the plurality of first scan sub-circuits is configured to output control signals in the second frame of image at a frequency higher than a frequency of outputting control signals in the first frame of image by the at least another one of the plurality of first scan sub-circuits.

8. The driving circuit of claim 6, wherein, in the second mode, at least one of the plurality of first scan sub-circuits is not configured to output control signals in the second frame of image; and at least another one of the plurality of first scan sub-circuits is configured to output control signals in the second frame of image at a frequency higher than a frequency of outputting control signals in the first frame of image by the at least another one of the plurality of first scan sub-circuits.

9. The driving circuit of claim 6, wherein the one or more scan circuits further comprises a third scan circuit configured to provide control signals to the plurality of display sub-areas with a same frequency in the first frame of image and the second frame of image.

10. The driving circuit of claim 1, wherein the one or more scan circuits further comprises an auxiliary first scan circuit;

the first scan circuit and the auxiliary first scan circuit are configured to independently provide control signals to a first display sub-area first part and a first display sub-area second part of a first display sub-area; and a respective row of subpixels in the first display sub-area first part and a respective row of subpixels in the first display sub-area second part are in a same row.

11. A display apparatus, comprising a display panel, a driving circuit, and a plurality of start signal lines;

wherein the driving circuit comprises one or more scan circuits;

wherein the one or more scan circuits comprise a first scan circuit;

wherein the first scan circuit comprises a plurality of first scan sub-circuits; and at least two first scan sub-circuits of the plurality of first scan sub-circuits are configured to drive two display sub-areas of a plurality of display sub-areas of a display area with two different driving frequencies in at least one frame of image, respectively;

wherein the display panel comprises the display area; and the display area comprises the plurality of display sub-areas;

wherein, in a second mode, the plurality of start signal lines are configured to provide start signals to the plurality of first scan sub-circuits with a same frequency in a first frame of image; and at least two start signal lines of the plurality of start signal lines are configured to provide start signals to the at least two respective scan sub-circuits of the plurality of respective scan sub-circuits with two different frequencies in a second frame of image, respectively.

12. The display apparatus of claim 11, wherein at least two start signal lines of the plurality of start signal lines are configured to provide start signals to the at least two first scan sub-circuits of the plurality of first scan sub-circuits with two different frequencies in at least one frame of image, respectively.

13. The display apparatus of claim 11, wherein, in a first mode, the plurality of start signal lines are configured to provide start signals to the plurality of first scan sub-circuits with a same frequency.

14. The display apparatus of claim 11, wherein, in the second mode, at least one of the plurality of start signal lines is configured to provide start signals in the second frame of image to at least one of the plurality of first scan sub-circuits at a frequency lower than a frequency of providing start signals in the first frame of image by the at least one of the plurality of start signal lines to the at least one of the plurality of first scan sub-circuits; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

15. The display apparatus of claim 11, wherein, in the second mode, at least one of the plurality of start signal lines is not configured to provide start signals in the second frame of image; and at least another one of the plurality of start signal lines is configured to provide start signals in the second frame of image to at least another one of the plurality of first scan sub-circuits at a frequency higher than a frequency of providing start signals in the first frame of image by the at least another one of the plurality of start signal lines to the at least another one of the plurality of first scan sub-circuits.

16. The display apparatus of claim 11, wherein the one or more scan circuits further comprises a third scan circuit;

the plurality of start signal lines comprise a third signal line configured to provide a third start signal to the third scan circuit; and the third scan circuit is configured to provide control signals to the plurality of display sub-areas with a same frequency in the first frame of image and the second frame of image.

17. The display apparatus of claim 11, wherein the one or more scan circuits further comprises an auxiliary first scan circuit;

the plurality of display sub-area comprise a first display sub-area;

the first display sub-area comprises a first display sub-area first part and a first display sub-area second part;

a respective row of subpixels in the first display sub-area first part and a respective row of subpixels in the first display sub-area second part are in a same row; and the first scan circuit and the auxiliary first scan circuit are configured to independently provide control signals to the first display sub-area first part and the first display sub-area second part.

* * * * *